(12) United States Patent
Nishijima

(10) Patent No.: US 8,116,539 B2
(45) Date of Patent: Feb. 14, 2012

(54) IMAGE CAPTURING APPARATUS AND METHOD FOR CONTROLLING IMAGE CAPTURING

(75) Inventor: Masakazu Nishijima, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 426 days.

(21) Appl. No.: 12/403,921

(22) Filed: Mar. 13, 2009

(65) Prior Publication Data

US 2009/0237521 A1 Sep. 24, 2009

(30) Foreign Application Priority Data

Mar. 19, 2008 (JP) .................................. 2008-072184

(51) Int. Cl.
*G06K 9/00* (2006.01)
*H04N 7/18* (2006.01)

(52) U.S. Cl. ........................................ 382/118; 348/143
(58) Field of Classification Search .................. 348/143; 382/118

See application file for complete search history.

(56) References Cited

U.S. PATENT DOCUMENTS

| | | | | |
|---|---|---|---|---|
| 7,940,956 B2* | 5/2011 | Kinoshita et al. | ............. | 382/103 |
| 2007/0115363 A1 | 5/2007 | Nakamura | | |
| 2007/0177036 A1* | 8/2007 | Kawada | ......... | 348/239 |
| 2007/0247524 A1* | 10/2007 | Yoshinaga et al. | ............. | 348/78 |
| 2008/0025710 A1* | 1/2008 | Sugimoto | ....... | 396/48 |
| 2008/0159628 A1* | 7/2008 | Yoshida | ......... | 382/190 |
| 2008/0170132 A1* | 7/2008 | Yi et al. | ....... | 348/222.1 |
| 2008/0239104 A1* | 10/2008 | Koh | ........... | 348/240.99 |
| 2008/0240519 A1* | 10/2008 | Nagamitsu | ..... | 382/118 |
| 2009/0009652 A1* | 1/2009 | Sudo et al. | ....... | 348/349 |
| 2009/0059061 A1* | 3/2009 | Yu et al. | ......... | 348/347 |
| 2009/0079844 A1* | 3/2009 | Suzuki | ......... | 348/222.1 |
| 2009/0102940 A1* | 4/2009 | Uchida | ....... | 348/222.1 |
| 2009/0135291 A1* | 5/2009 | Sugimoto | ..... | 348/347 |
| 2010/0149369 A1* | 6/2010 | Yasuda | ....... | 348/222.1 |

FOREIGN PATENT DOCUMENTS

| | | |
|---|---|---|
| JP | 2006-074368 A | 3/2006 |
| JP | 2007-041964 A | 2/2007 |
| JP | 2007-142866 A | 6/2007 |

OTHER PUBLICATIONS

Notification of Reasons for Rejection, dated Oct. 18, 2011, issued in corresponding JP Application No. 2008-072184, 4 pages in English and Japanese.

* cited by examiner

*Primary Examiner* — Lin Ye
*Assistant Examiner* — Chia-Wei A Chen
(74) *Attorney, Agent, or Firm* — Sughrue Mion, PLLC

(57) ABSTRACT

An image capturing apparatus includes: an image capturing device which receives an optical image of an object subjected to light via an image capturing lens and converts the optical image into an image signal; a face detecting device which detects a plurality of human faces from the image signal; a face distance calculating device which calculates a distance between the detected human faces; a notice device which gives a notice corresponding to the calculated distance between the human faces; a timer shot device which performs a real shooting after an elapse of a first predetermined time since a shooting instruction; and a control device which gives the shooting instruction to the timer shot device when the calculated distance between the human faces is less than a predetermined value. Accordingly, even when the shooting object includes persons, a well composed shooting can be easily realized.

18 Claims, 22 Drawing Sheets

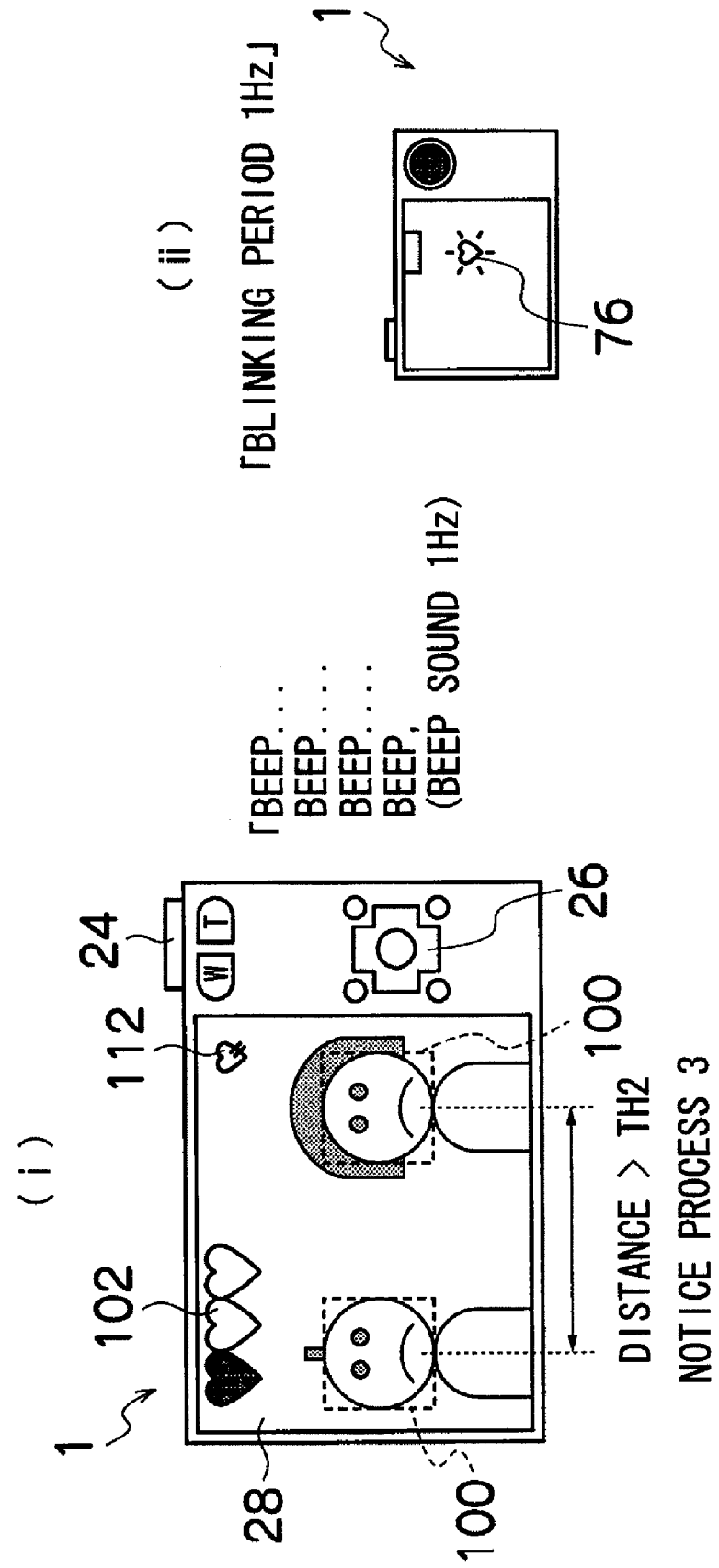

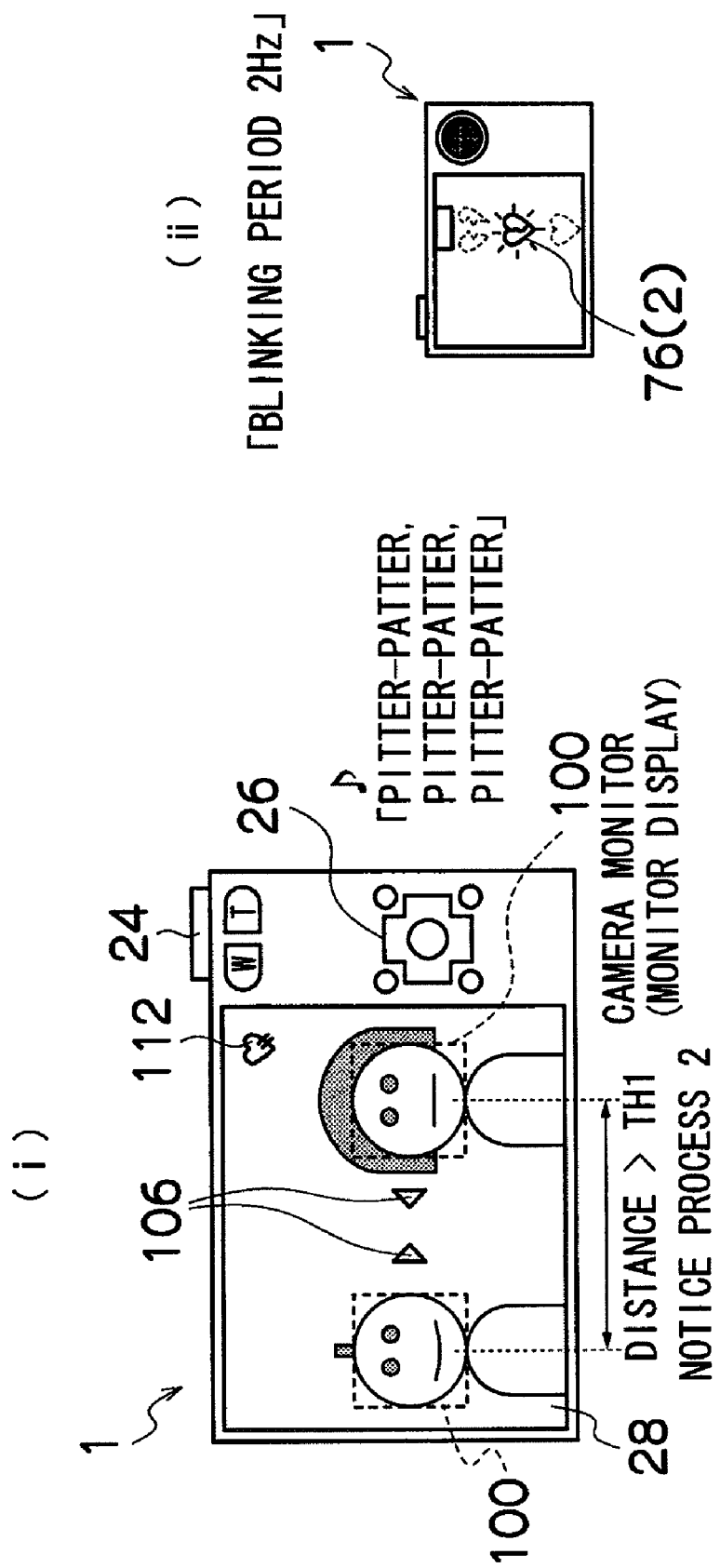

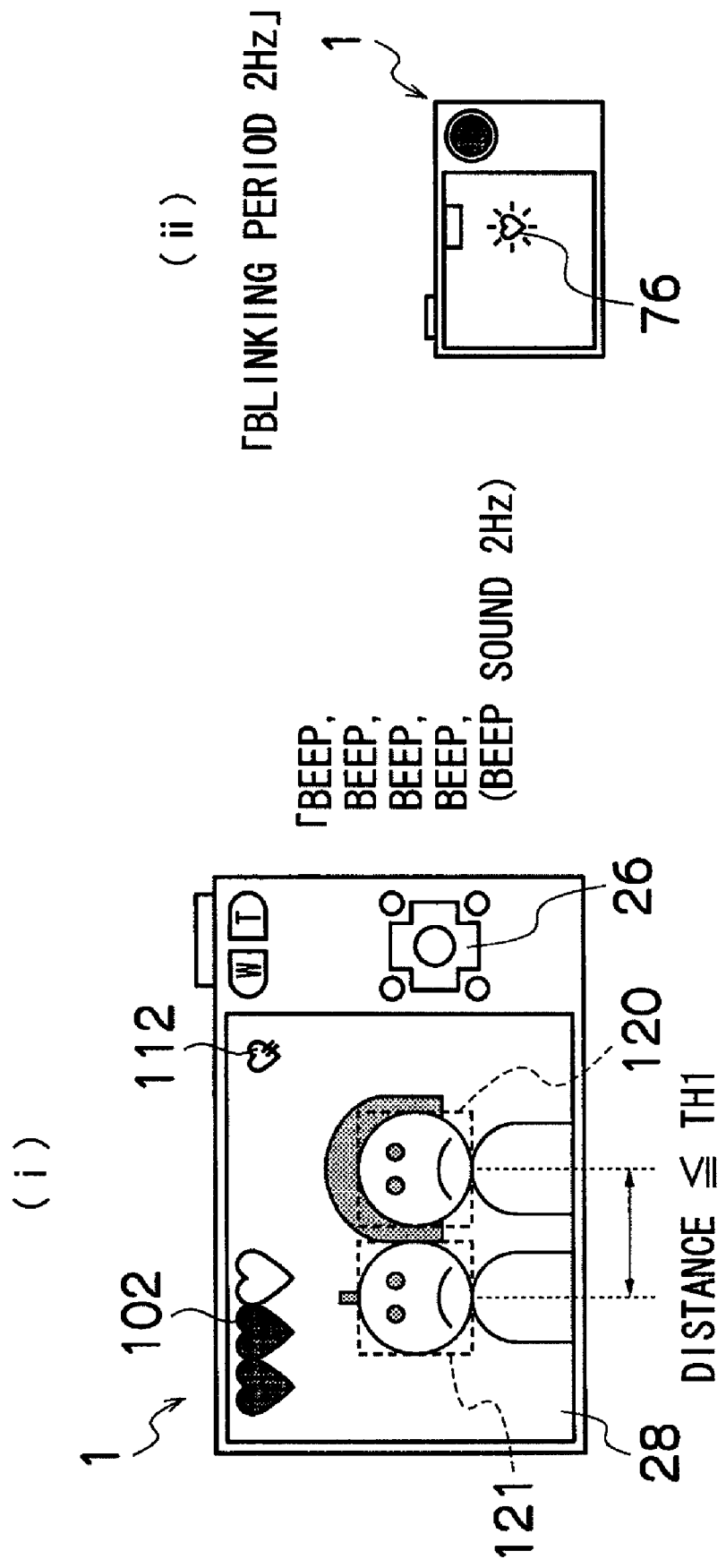

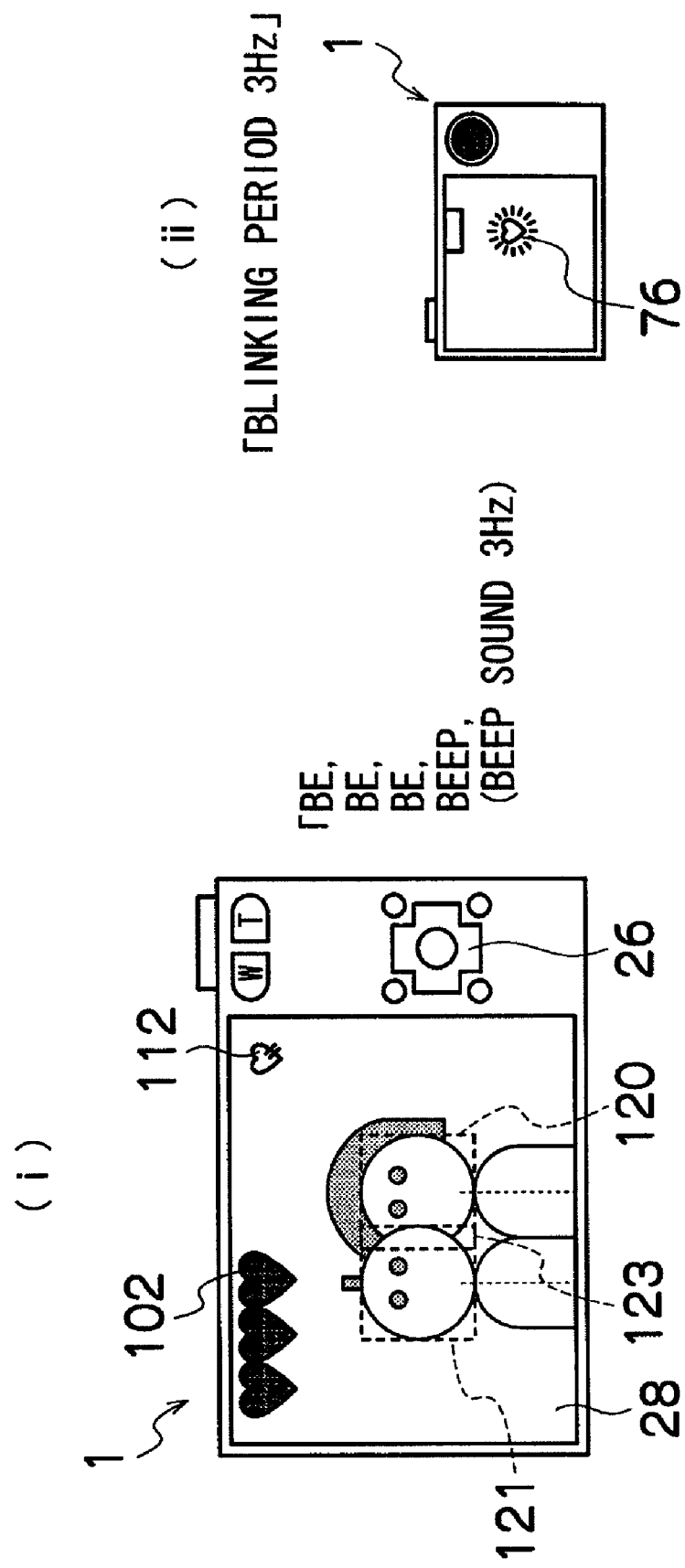

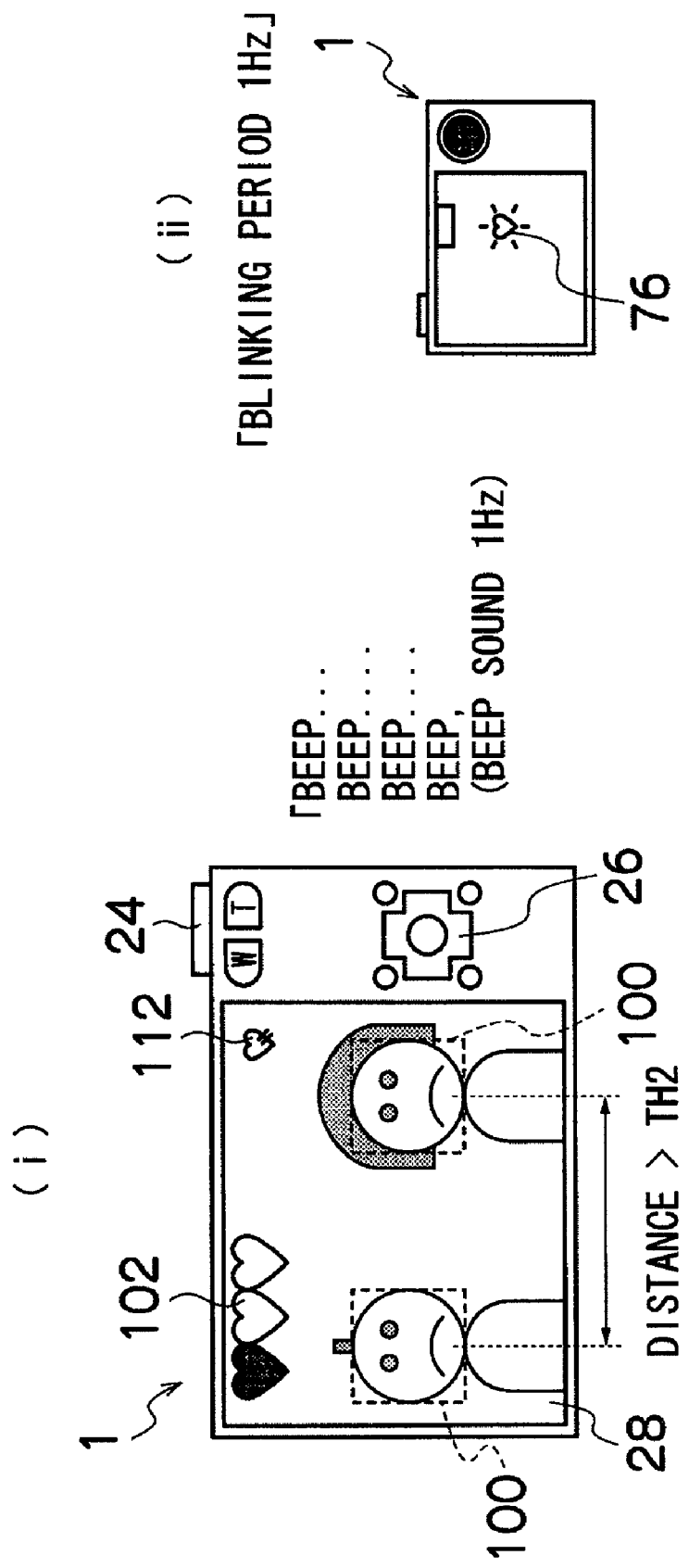

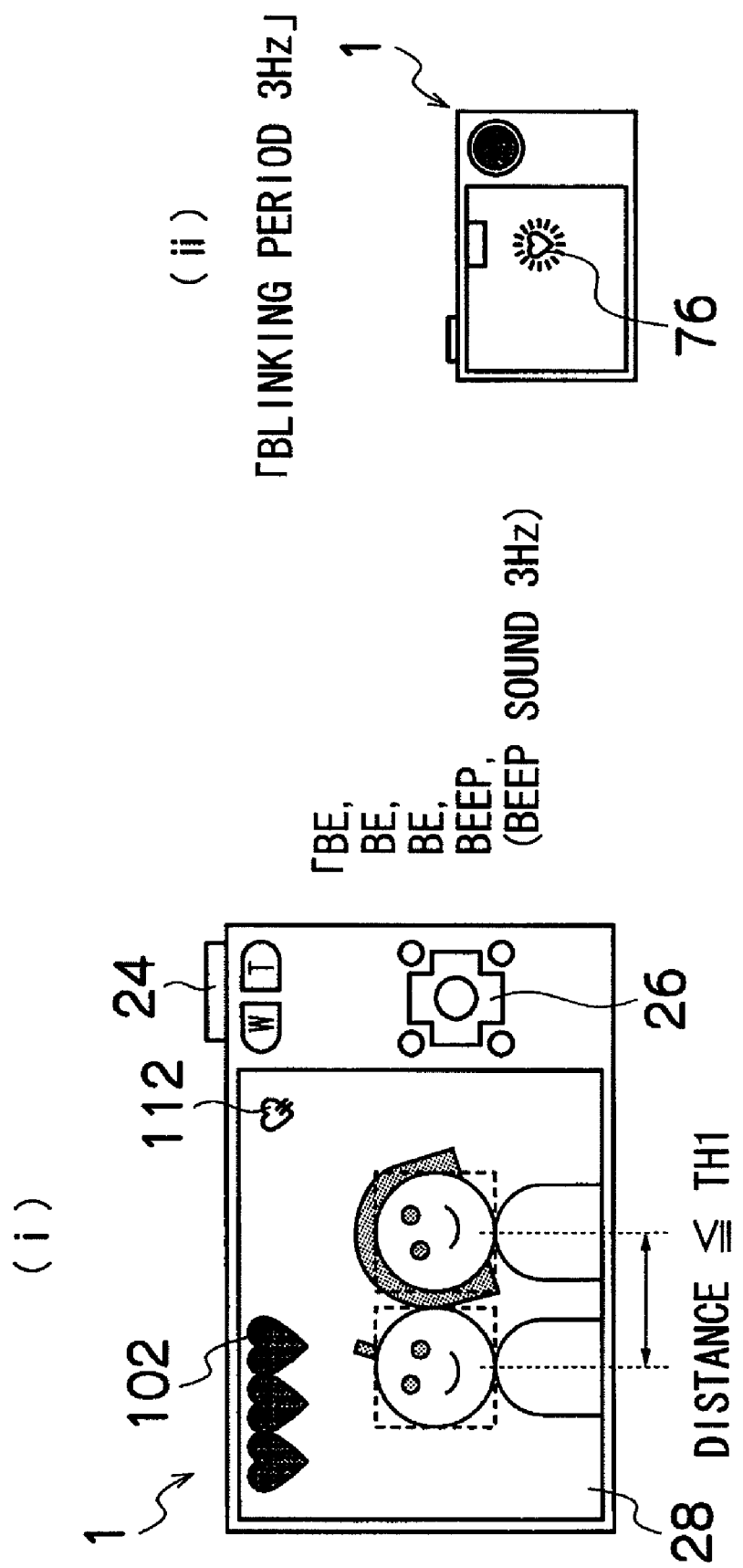

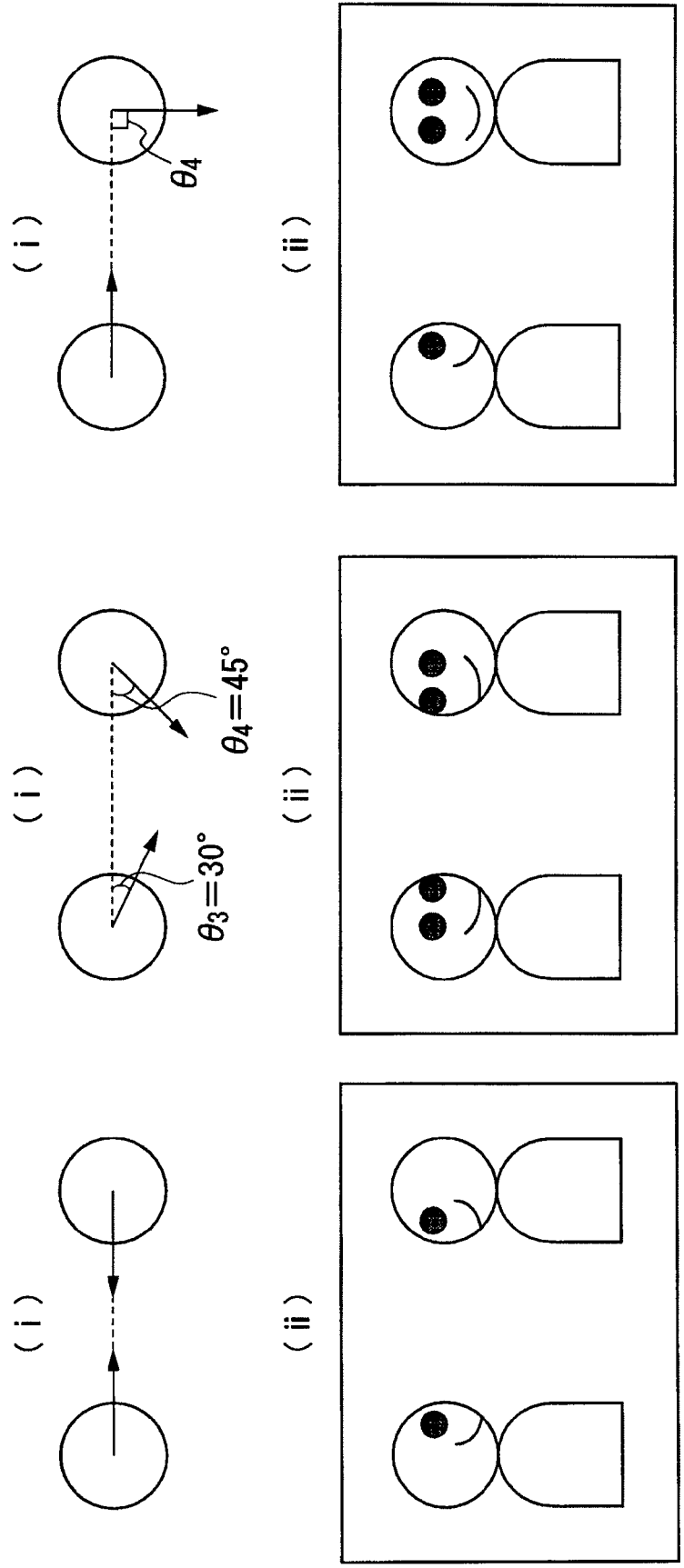

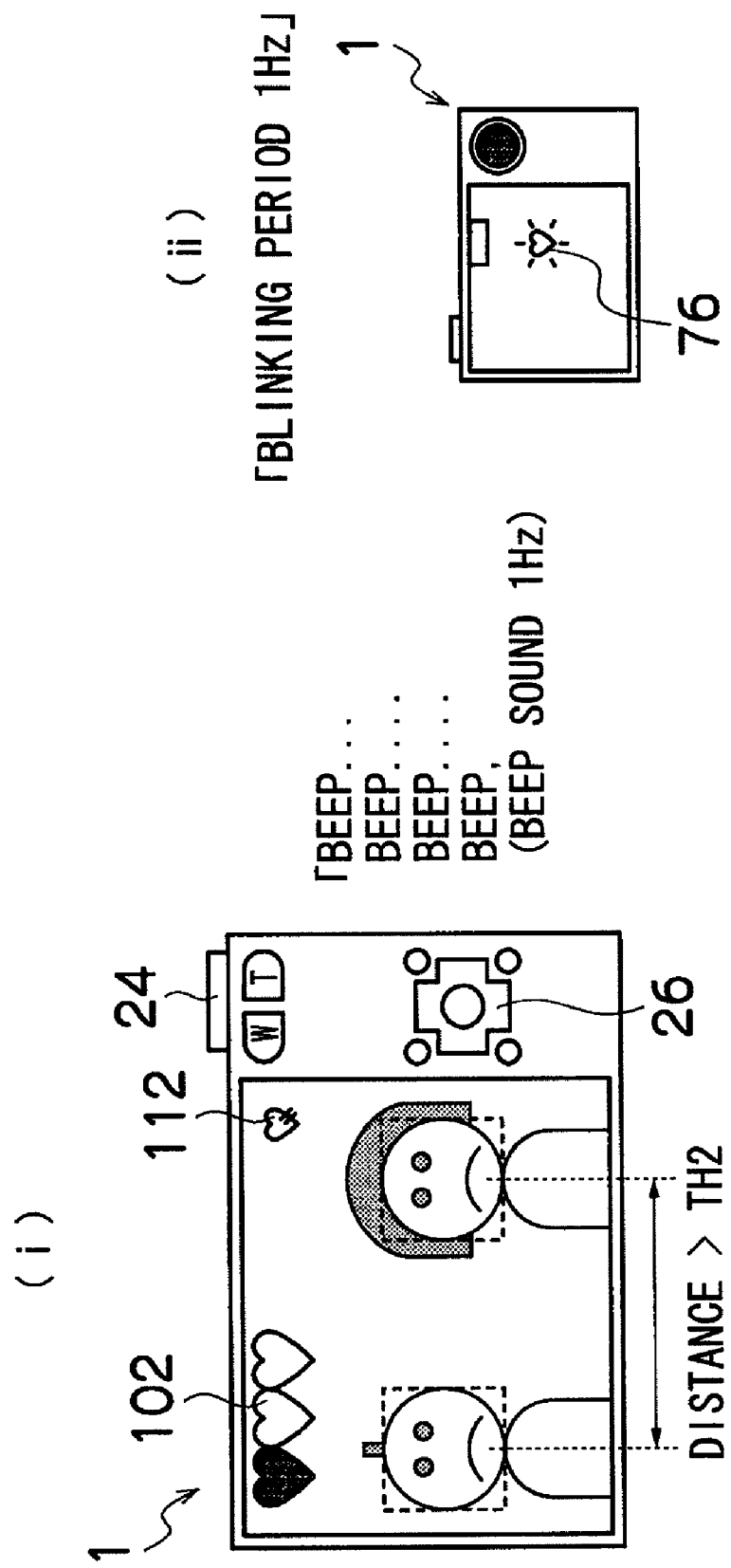

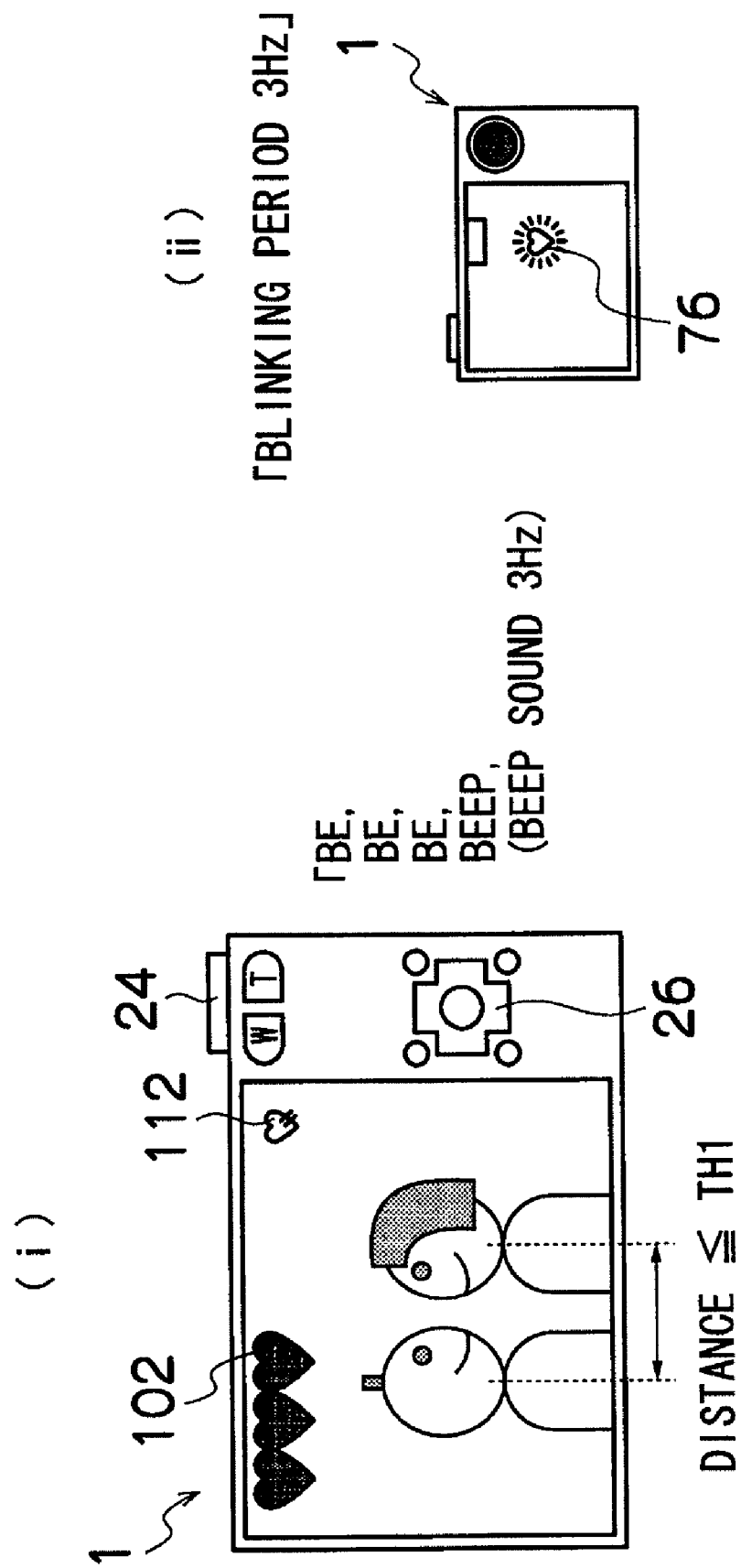

IMAGE CAPTURING APPARATUS AND METHOD FOR CONTROLLING IMAGE CAPTURING

BACKGROUND OF THE INVENTION

1. Field of the Invention

The present invention relates to an image capturing apparatus and a method for controlling image capturing. More specifically, the invention relates to an image capturing apparatus and a method for controlling image capturing which display an object and output an audio in accordance with a positional relation of the object.

2. Description of the Related Art

An apparatus which does a composition assist by detecting a person from an image captured with an image capturing apparatus is known. For example, Japanese Patent Application Laid-Open No. 2007-142866 discloses an image capturing apparatus which displays a mark showing a direction in which the image capturing apparatus should be moved in order to obtain a human face within an image capturing range, when the human face is out of the image capturing range. According to the apparatus of Japanese Patent Application Laid-Open No. 2007-142866, it is possible to obtain a human face within the image capturing range by instantly determining the direction in which the image capturing apparatus should be moved without recognizing the position of the human face.

SUMMARY OF THE INVENTION

However, the apparatus of Japanese Patent Application Laid-Open No. 2007-142866 has a problem that it is not possible to assist photographing so as to make a good composition when the object is more than one person.

The present invention has been made in view of the above circumstances and has an object to provide an image capturing apparatus and a method for controlling image capturing which improve usability at shots by oneself, a third party and a self-timer by assisting the photographing to make a good composition even when the object is more than one person.

To achieve the object above, an image capturing apparatus according to a first aspect of the present invention includes: an image capturing device which receives an optical image of an object subjected to light via an image capturing lens and converts the optical image into an image signal; a face detecting device which detects a plurality of human faces from the image signal; a face distance calculating device which calculates a distance between the detected human faces; a notice device which gives a notice corresponding to the calculated distance between the human faces; a timer shot device which performs a real shooting after an elapse of a first predetermined time since a shooting instruction; and a control device which gives the shooting instruction to the timer shot device when the calculated distance between the human faces is less than a predetermined value.

Thereby, the objective persons (persons to be photographed) can be in the predetermined position and make a facial expression without panic.

According to a second aspect of the present invention, in the image capturing apparatus according to the first aspect, the control device gives the shooting instruction to the timer shooting device, when a state in which the calculated distance between the human faces is less than the predetermined value lasts for a second predetermined time or more.

Therefore, it is possible to improve the accuracy because it is strong against a disturbance condition such as a person walking in the background.

According to a third aspect of the present invention, in the image capturing apparatus according to the first or second aspects, the control device gives the shooting instruction to the timer shooting device, when a state in which the calculated distance between the human faces is the predetermined value or more lasts for a third predetermined time or more.

In this way, it is possible to perform shooting, even when the predetermined conditions are not fully satisfied.

According to a fourth aspect of the present invention, in the image capturing apparatus according to the first or second aspects, the notice device gives a warning when a state in which the calculated distance between the human faces is the predetermined value or more lasts for a third predetermined time or more.

Therefore, it is possible to let a user know that the predetermined conditions are not satisfied for a long time.

According to a fifth aspect, the image capturing apparatus according to any one of the first to fourth aspects further includes a switching device which switches the control device between an enable state and a disable state.

Therefore, it is possible to continuously shoot pictures with various expressions while fixing a composition until an operation to disable the control device is performed.

According to a sixth aspect, in the image capturing apparatus according to the fifth aspect, the switching device is a shutter release button, and the control device is switched between the enable state and the disable state every time when the shutter release button is operated.

This makes it possible to switch the control device to enable and to disable easily.

According to a seventh aspect, in the image capturing apparatus according to the fifth or sixth aspects, the switching device switches the control device to the disable state when a state in which the calculated distance between the human faces is the predetermined value or more lasts for a fourth predetermined time or more.

This makes it possible to prevent meaningless operation and save power consumption.

According to an eighth aspect, the image capturing apparatus according to any one of the first to seventh aspects, further includes an operation mode switching device which switches an operation mode of the image capturing apparatus, and the control device is set in the enable state when the operation mode is set in a prescribed mode by setting the operation mode switching device.

Therefore, it is possible to use the composition assist only when it is needed.

According to a ninth aspect, the image capturing apparatus according to any of the first to eighth aspects, further includes an evaluation value calculating device which calculates an evaluation value indicating whether a composition of the image signal is good or not according to at least one of parameters including a degree of overlapping of the detected human faces, a difference of directions of the detected human faces, and an inclination of the detected human faces, and the control device gives a shooting instruction to the timer shooting device when the calculated distance between the human faces is less than the predetermined value and the evaluation value of the evaluation value calculating device is a predetermined value or more.

In this way, it is possible to properly determine the positional relation of the faces and give a notice based on the determination result.

According to a tenth aspect, in the image capturing apparatus according to any of the first to ninth aspects, the notice device gives a notice corresponding to the distance between the human faces calculated based on sizes of the detected human faces.

Therefore, it is possible to properly determine the positional relation of the faces and give a notice based on the determination result.

According to an eleventh aspect, in the image capturing apparatus according to any of the first to tenth aspects, the face distance calculating device calculates a distance between a human face located nearest to a center of a shot image among the detected human faces and another human face whose size is closest to that of the human face located nearest to the center.

In this manner, the composition assist can be properly performed for the main object.

According to a twelfth aspect, in the image capturing apparatus according to any of the first to tenth aspects, the face distance calculating device calculates a distance between a largest face among the detected human faces and another face whose size is closest to the largest face.

In this manner, the composition assist can be properly performed for the main object.

According to a thirteenth aspect, in the image capturing apparatus according to any of the first to twelfth aspects, the notice device includes at least one of a display device, a sound generating device, and a light emitting device.

Thus, it is possible to give a notice to the user and the objective persons in order to easily make a proper composition.

According to a fourteenth aspect, in the image capturing apparatus according to the thirteenth aspect, the display device displays a pass-through image according to the image signal and gives a notice corresponding to the calculated distance between the human faces.

Therefore, it is possible to perform the composition assist while the user checks the through image.

According to a fifteenth aspect, in the image capturing apparatus according to the thirteenth or fourteenth aspects, the display device gives a notice by displaying an icon corresponding to the calculated distance between the human faces.

In this way, it is possible to assist on composition in a way that the user can easily understand.

According to a sixteenth aspect, in the image capturing apparatus according to any of the thirteenth to fifteenth aspects, the sound generating device gives a notice by outputting a voice which differs depending on the calculated distance between the human faces.

In this way, it is possible to assist on composition in a way that the user can easily understand.

According to a seventeenth aspect, in the image capturing apparatus according to any of the thirteenth to sixteenth aspects, the sound generating device gives a notice by changing a frequency of an output sound depending on the calculated distance between the human faces.

In this way, it is possible to assist on composition in a way that the user can easily understand.

According to an eighteenth aspect, in the image capturing apparatus according to any of the thirteenth to seventeenth aspects, the light emitting device gives a notice by changing a blinking period depending on the calculated distance between the human faces.

In this way, it is possible to assist on composition in a way that the user can easily understand.

To achieve the object above, a method for controlling an image capturing according to a nineteenth aspect of the present invention includes: an image capturing step of receiving an optical image of an object subjected to light via an image capturing lens and converting the optical image into an image signal; a face detecting step of detecting human faces from the image signal; a face distance calculating step of calculating a distance between the detected human faces; a notifying step of giving a notice corresponding to the calculated distance between the human faces; a timer shot step of performing a real shooting after an elapse of a first predetermined time since a shooting instruction; and a control step of giving a shooting instruction to the timer shot step when the calculated distance between the human faces is less than a predetermined value.

Therefore, the objective persons can take a predetermined positioning and make a facial expression without panic.

According to any aspects of the present invention, it possible to provide an image capturing apparatus and a method for controlling image capturing which improve usability at shoots by oneself, a third party and a self-timer by assisting image capturing in order to make a good composition even when the object includes more than one person.

BRIEF DESCRIPTION OF THE DRAWINGS

FIGS. 5A to 5C are diagrams which show actions of a monitor 28, a LED 76 and a speaker 80 at the couple shot timer mode;

FIGS. 6A to 6C are diagrams which show another configuration of actions of a monitor 28, a LED 76 and a speaker 80 at the couple shot timer mode;

FIGS. 8A to 8C are diagrams which show each notice process of a second embodiment;

FIGS. 10A to 10C are diagrams which show each notice process of a third embodiment;

FIGS. 11A to 11C are diagrams which show differences of turning angles between two representative faces; and FIGS. 12A to 12C are diagrams which show each notice process of a fourth embodiment.

DETAILED DESCRIPTION OF THE PREFERRED EMBODIMENT

Referring to the accompanying drawings, a detailed description will be given below of preferred embodiments of the present invention.

First Embodiment

Figure 1:
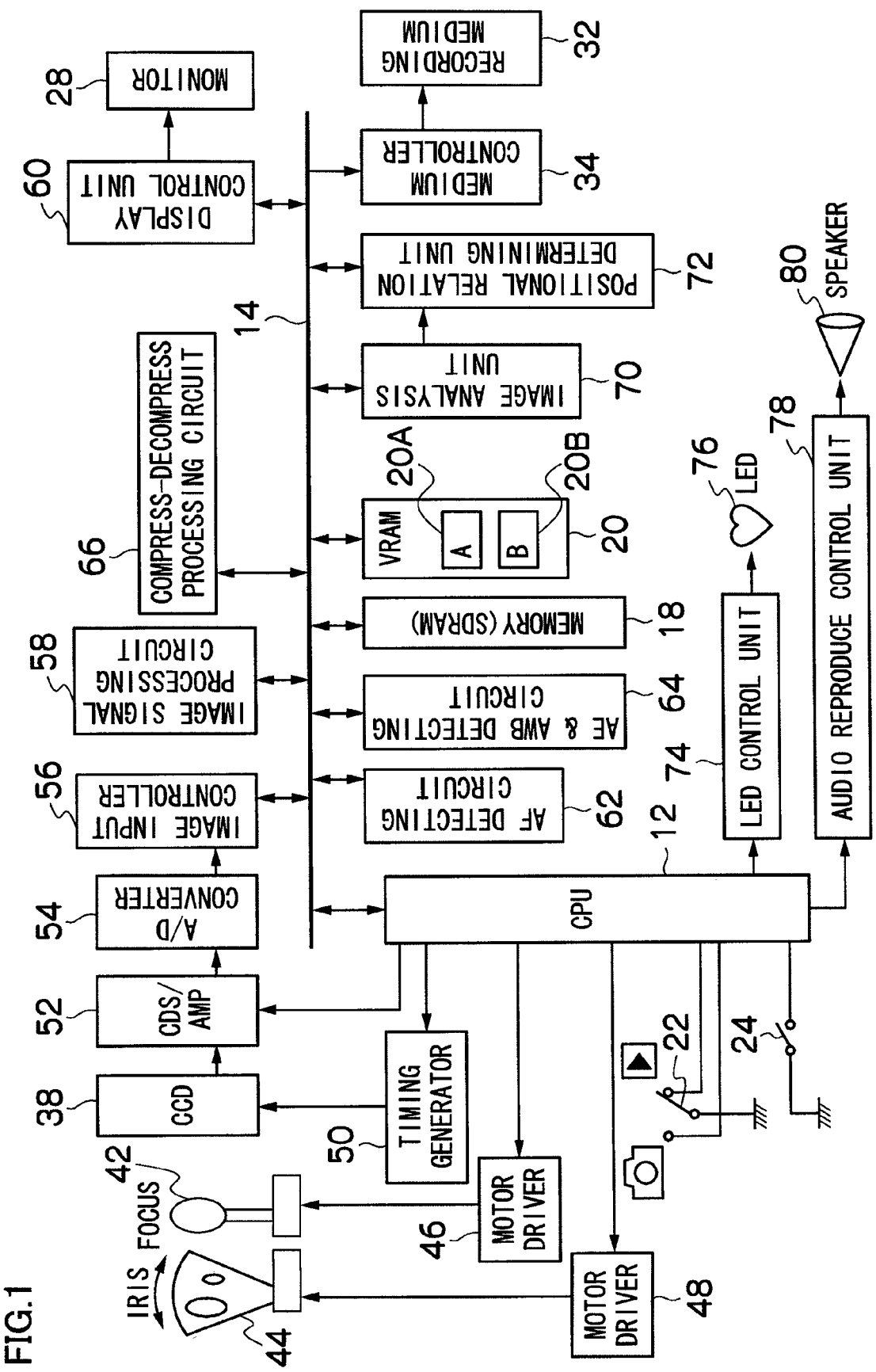
FIG. 1 is a block diagram of a first embodiment of a digital camera 1 according to the present invention.

FIG. 1 is the block diagram of the first embodiment of the digital camera 1 according to the present invention.

An entire action of the digital camera 1 is integrally controlled by a central processing unit (CPU) 12.

The CPU 12 works as a control device to control the digital camera 1 according to a predetermined program and as an arithmetic processing device to carry out various arithmetic operations such as an automatic exposure (AE) operation, an autofocus (AF) operation, and a white balance (WB) adjusting operation.

A CCD pixel defect information, various constants, information and the like related to the camera action are stored in a ROM (not shown) which is connected to CPU 12 via a bus 14, as well as various data needed for CPU 12 to execute a program and control.

Also, a memory (SDRAM) 18 is used as a temporary storage area of an image data and audio data as well, in addition to as a developing area of the program and an arithmetic processing area of the CPU 12. A VRAM 20 is a temporary storage memory for an image data and includes an A area 20A and a B area 20B. The memory 18 and the VRAM 20 can be in common use.

A mode switch 22 sets a shot mode and when a shutter button 24 is clicked, a shooting of a still image is started.

The CPU 12A drives a focus lens 42 and an aperture 44 with a motor driver 46 of the focus lens 42 and a motor driver 48 of the aperture 44 based on the detection result by an AF detect circuit 62 and an AE/AWB detect circuit 64 so as to appropriately adjust a focus and an aperture.

An object image formed in a CCD 38 via a lens unit 40 is converted to a signal charge R, G, B having an amount corresponding to an amount of an incident light by each photodiode.

The accumulated signal charges in each photodiode are send to a CDS/AMP 52 circuit according to a driving pulse given by a timing generator 50 which is following the command of the CPU 12, the accumulated signal charges are amplified here after processed a correlative double sampling, and then added to an A/D converter 54.

The dot sequential R, G, B signals which are converted to a digital signals by the A/D converter 54 are stored in the memory 18 via an image input controller 56.

An image signal processing circuit 58 processes the R, G, B signals stored in the memory 18 according to the command of the CPU 12, and converts the R, G, B signal to luminance signals (Y signal) and to color difference signals (Cr, Cb signal). Then, the image signal processing circuit 58 stores the R, G, B signals in the memory 18 again.

The image data processed in the image signal processing circuit 58 is stored in the VRAM 20.

A display control unit 60 converts the image data which is input from the VRAM 20 via the bus 14 to the signal of a predetermined system to display (for example, a color composite image signal of NTSC) (NTSC: National Television System Committee), and outputs on the monitor 28. A photographer can check an angle of view with the image (a pass-through image, or through image) displayed on the monitor 28.

On the other hand, a Y/C signal which is stored in the memory 18 is compressed according to a predetermined format by a compress-decompress processing circuit 66, and recorded in a recording medium 32 with a medium controller 34, for example recorded in the JPEG format.

Figure 2:
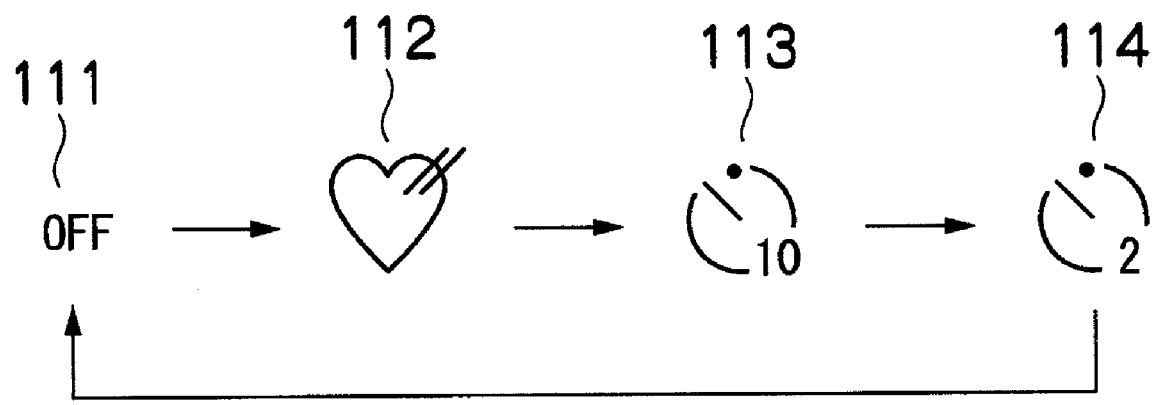
FIG. 2 is a diagram which shows a detailed switching of a self-timer mode.
Figure 5B:
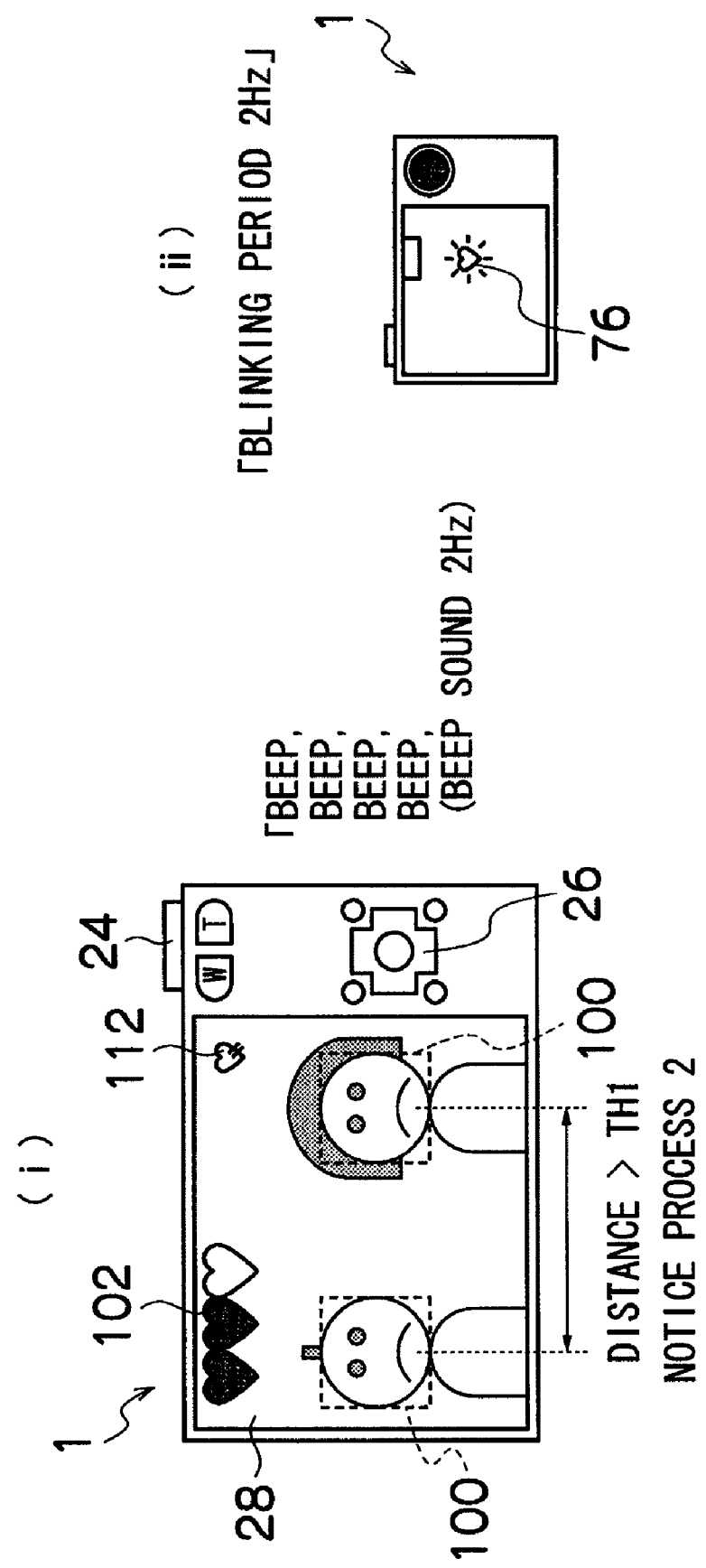
Figure 5C:
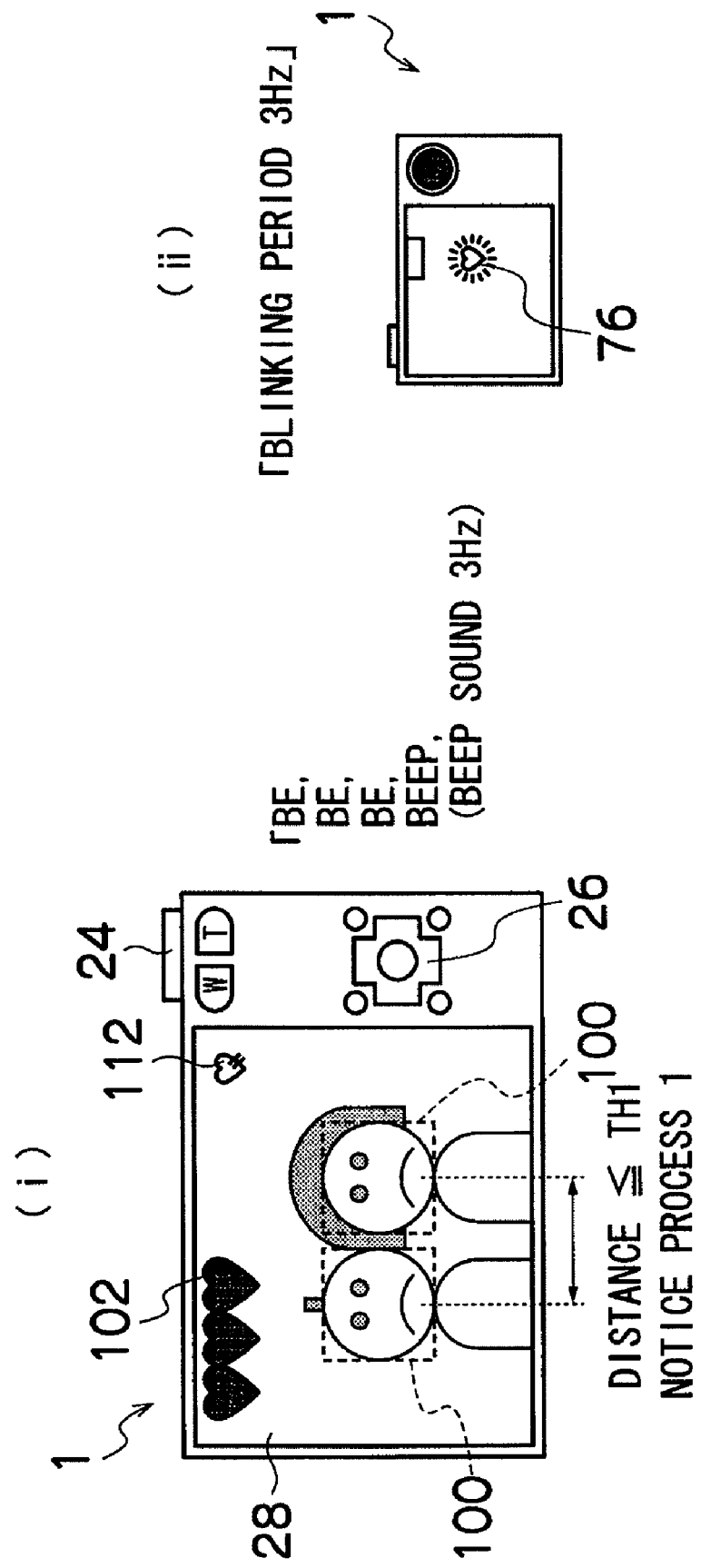

At this point, with setting to the shot mode by the mode switch 22, the detail of the self-timer mode is switched by pressing down a down arrow button of an arrow key 26 shown in FIGS. 5A to 5C. FIG. 2 is the diagram which shows the detailed switching of the self-timer mode. The modes are switched and icons corresponding to the modes 111 to 114 are changed and displayed, each time the down arrow button of the arrow key 26 is pressed down.

When the digital camera 1 is set to the shot mode by the mode switch 22, the self-timer mode is off and the icon shown as 111 is displayed on the monitor 28. When the down arrow button of the arrow key 26 is pressed down in this state, the self-timer is set to be the couple shot timer mode and the icon shown as 112 is displayed on the monitor 28. The detail of the couple shot timer mode is hereinafter described.

When the down arrow button of the arrow key 26 is pressed down once more, the self-timer mode is set to be a ten second mode and the icon shown as 113 is displayed on the monitor 28. The ten second mode is the mode that the real shooting is performed ten seconds after the shutter button 24 is pressed down. Additionally, the down arrow button of the arrow key 26 is pressed down once more again, the self-timer mode is set to be a two second mode and the icon shown as 114 is displayed on the monitor 28. The two second mode is the mode that the real shooting is performed two seconds after the shutter button 24 is pressed down. When the down arrow button of the arrow key 26 is pressed down once more, it returns to the first state that is the self-timer mode is off.

In this way, a user can choose the couple shot timer mode by pressing down the down arrow button of the arrow key 26.

The CPU 12 starts to control an image analysis unit 70, a positional relation determining unit 72, a LED control unit 74, and an audio reproduce control unit 78, when the digital camera 1 is set to be the couple shot timer mode.

The image analysis unit 70 analyses the image signal for the through image which is obtained from CCD 38 and extracts face information of persons. The positional relation determining unit 72 determines the positional relation of the human faces which is extracted by the image analysis unit 70 by referring the positional relation pattern read from the memory 18 and comparing to the face information. The LED control unit 74 controls the lighting up and out of the LED 76 according to the instruction of a speaker 80 and the audio reproduce control unit 78 outputs the voice according to the instruction of the CPU 12.

Next, the actions of the digital camera 1 at the couple shot timer mode are described with using FIG. 3 to FIG. 5C.

Figure 3:
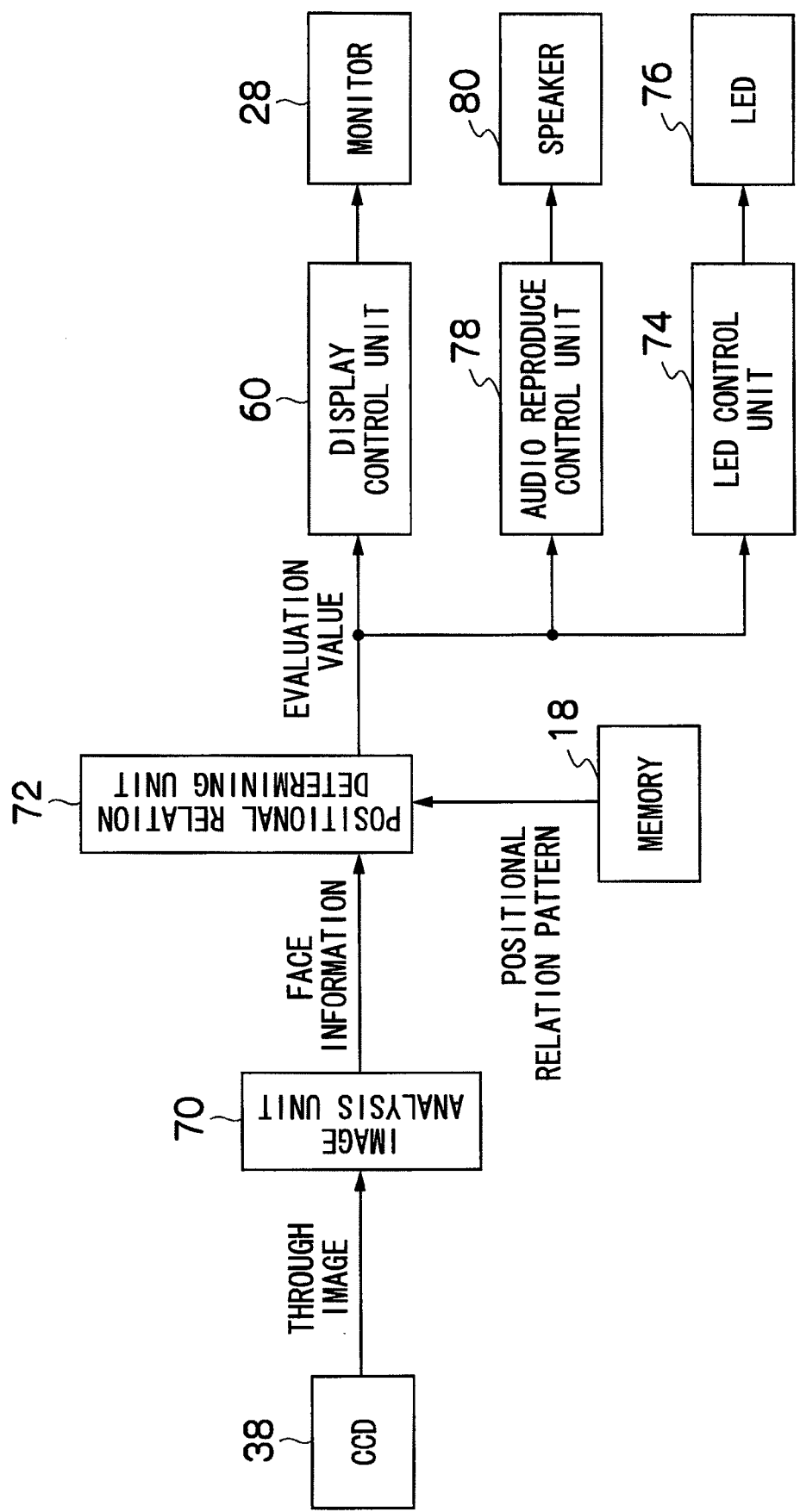
FIG. 3 is a function diagram of the digital camera 1 at a couple shot timer mode.
Figure 4:
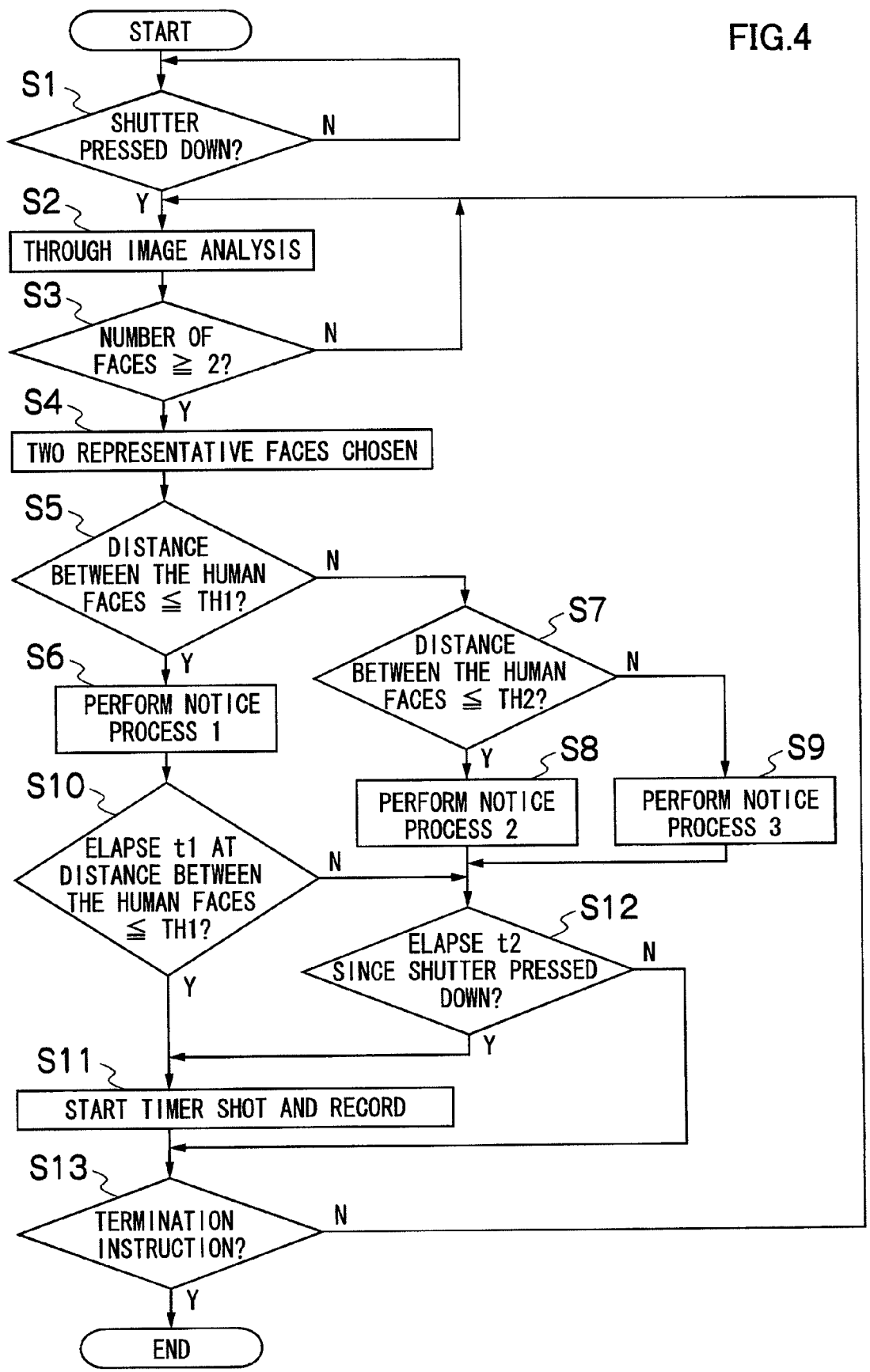
FIG. 4 is a flow chart which shows a processing inside the digital camera 1 at the couple shot timer mode.

FIG. 3 is the function diagram of the digital camera 1 at the couple shot timer mode, and FIG. 4 is the flow chart which shows the processing inside the digital camera 1 at the couple shot timer mode. Also, FIGS. 5A to 5C are diagrams which show actions of the monitor 28, the LED 76 and the speaker 80 at the same mode and, (i) and (ii) show the rear view and the front view of the digital camera 1 respectively.

When the digital camera 1 is set to the shot mode by the mode switch 22 and the down arrow button of the arrow key 26 is pressed down in this state, the through image shooting is started and the through image is displayed on the monitor 28.

In this state, it is determined if the shutter button 24 is pressed down or not (step S1). When the shutter button 24 is pressed down, the analysis of the through image is started (step S2). As shown in FIG. 3, the image analysis unit 70 obtains the image signal for the through image from the CCD 3 8 and extracts the face information of the person in the through image according to the image signal.

Next, it is determined if the number of the extracted face is more than one or not (step S3). In case that no face is extracted or the number of the extracted face is one, it returns to the step S2 and the analysis of the through image is repeatedly performed until more than one face is extracted.

In case that more than one face is extracted, the image analysis unit 70 chooses two faces as representative faces from the extracted faces (step S4). For example, two faces are chosen in descending order as the representative faces. Moreover, as the representative faces, the largest face appeared and the face which is as large as the largest one and placed nearest to the one can be chosen. Also, the face appeared in the midmost of the screen and the face which is as large as the one in the midmost and placed nearest to the one can be chosen. A face box 100 can be displayed on the through image to box the chosen representative faces so that the user recognizes them as the representative faces.

Next, the distance between the chosen representative faces is calculated, the calculated distance is compared to predetermined values TH1 and TH2, and then a way of giving a notice is decided.

Here, the values of TH1 and TH2 are decided based on the size of the representative faces, and, for example, it is possible to obtain by the formula below to be TH1<TH2.

$$TH1 = \alpha \times (\text{Face Size 1} + \text{Face Size 2}) \div 2 \quad \text{[Formula 1]}$$

$$TH2 = \beta \times (\text{Face Size 1} + \text{Face Size 2}) \div 2 \quad \text{[Formula 2]}$$

Here, "Face Size 1" and "Face Size 2" are the size of the representative faces and meet $\alpha < \beta$.

First of all, it is determined if the calculated distance between the human faces is equal to or less than TH1 (step S5). In case that the distance is larger than TH1, it is determined if the distance is equal to or less than TH2 (step S7). The positional relation determining unit 72 which obtained the face information of the two representative faces from the image analysis unit 70 calculates and determines the distance between the two faces based on the positional relation pattern stored in the memory 18. In addition, the positional relation determining unit 72 calculates an evaluated value based on the determination result and the display control unit 60, the LED control unit 74 and the voice reproduce control unit 78 control the monitor 28, the LED 76 and the speaker 80 respectively.

Specifically, in case that the calculated distance between the human faces is equal to or less than TH1, a notice process 1 is performed (step S6). In case that the calculated distance is larger than TH1 and equal to or less than TH2, a notice process 2 is performed (step S8). In case that the calculated distance is larger than TH2, a notice process 3 is performed (step S9).

FIG. 5A is a diagram which shows the notice process 3. The notice process 3 gives a notice to the user by lighting up one of heart shape icons 102 on the monitor 28. Also, a beep of 1 Hz is output from the speaker 80 (not shown) and the LED 76 which is provided on the front of the digital camera 1 blinks at 1 Hz to give a notice to persons to be photographed (objects).

FIG. 5B is a diagram which shows the notice process 2. The notice process 2 lights up two of heart shape icons 102 on the monitor 28 and gives a notice which means the distance between objects are closer than the case of the notice process 3. Also, the beep of 2 Hz is output from the speaker 80 (not shown) and the LED 76 which is provided on the front of the digital camera 1 blinks at 2 Hz.

FIG. 5C is a diagram which shows the notice process 1. The notice process 1 lights up three of heart shape icons 102 on the monitor 28. Also, the beep of 3 Hz is output from the speaker 80 (not shown) and the LED 76 which is provided on the front of the digital camera 1 blinks at 3 Hz.

When the notice process 1 is performed at the step S6, it is determined if the distance between the human faces stays equal to or less than TH1 for equal to or more than a time t1 (step S10). When the state stays for equal to or more than the time t1, the timer shooting is started. The real shooting is performed after the elapse of the predetermined time at the timer shooting and the obtained image signal by the real shooting is recorded in the recording medium 32 with the medium controller 34 (step S11). Then, the determination if the termination is instructed or not is performed (step S13).

The termination instruction is such as that the user presses down the shutter button 24 again, operates the mode change, and switches off the power. The shooting action with the couple shot timer mode is terminated, when the termination instruction described above is performed. When there is no termination instruction, it returns to the step S2, the analysis of the through image is performed and the shooting action with the couple shot timer mode is continued. When a state where the distance between the human faces is TH1 or less lasts for a time t1 (time period) or more, the timer shooting is performed.

When it is determined that the distance between the human faces is equal to or less than TH1 does not stay for equal to or more than a time t1 (step S10) at the step S10, it is determined if the time t2 elapses after that the shutter button 24 is pressed down (step S12). In the case where the time t2 elapses, the timer shooting is started and the real shooting and the image recording is performed after the predetermined time (step S11). In this way, in the case where the time t2 elapses after that the shutter button 24 is pressed down, the real shooting is performed even the distance between the human faces is larger than TH1. In addition, when the real shooting is performed because it is determined that the distance between the human faces stays equal to or less than TH1 for equal to or more than the time t1, timing of the time t2 is cleared and timing is started from the real shooting again.

A warning with the monitor 28, the LED 76 and the speaker 80 may be given to the user as well instead of performing the real shooting, in case that the time t2 elapses after that the shutter button 24 is pressed down.

When it is determined that the time t2 does not elapse at step S12, it moves to the step S13 and it is determined if the termination is instructed or not. In the case where there is no termination instruction, the shooting action is terminated. However, the shooting action is restarted, when the shutter button 24 is pressed down again and it is determined that the shutter button 24 is pressed down at the step S1.

In case where the termination instruction is given by pressing down the shutter button 24, the shooting action is terminated. However, at this point, when the shutter button 24 is pressed down again, the shooting action is restarted after that the shutter button 24 is pressed down is determined at the step S1.

The notice of the positional relation of the objects is not limited to the ways of giving the notice shown in FIGS. 5A to 5C and it may take other forms.

Figure 6A:
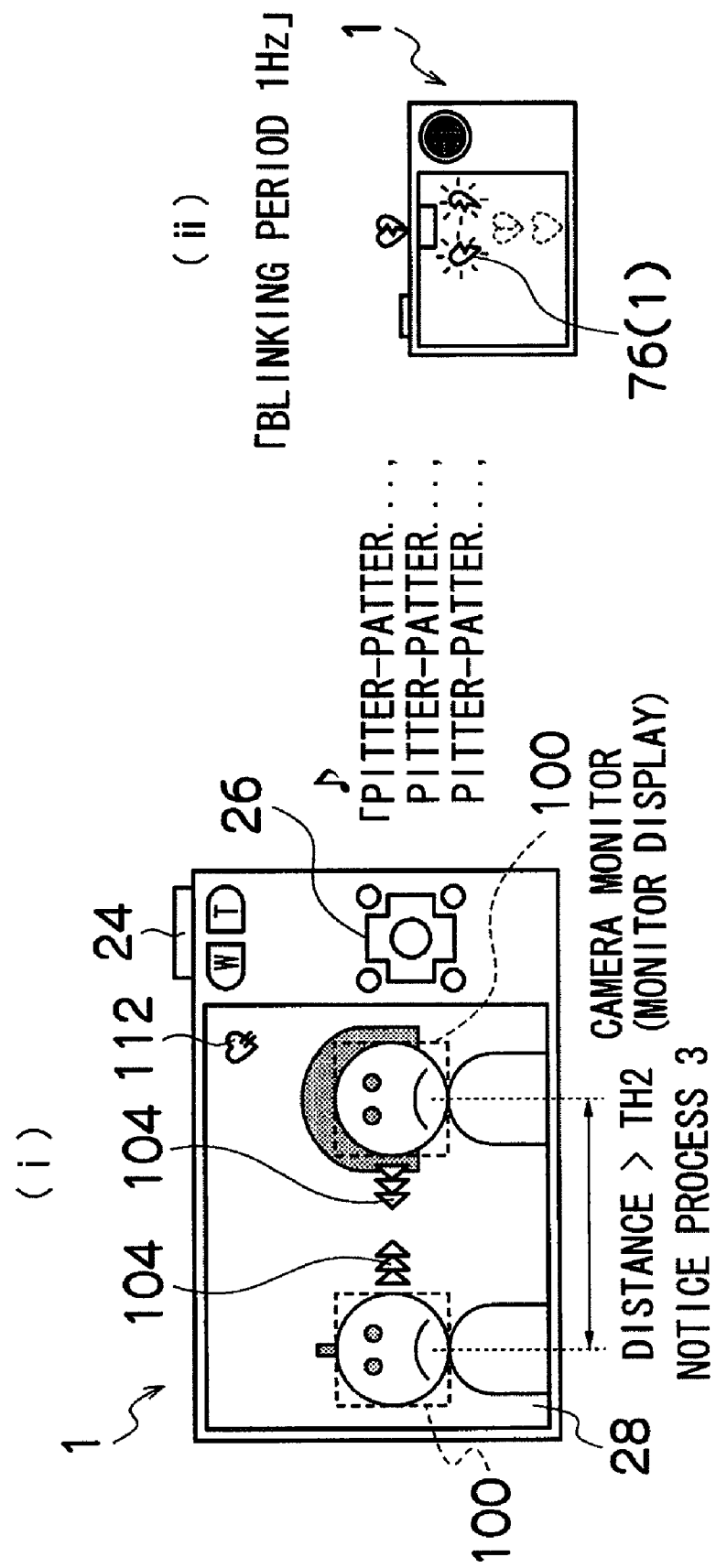
Figure 6C:
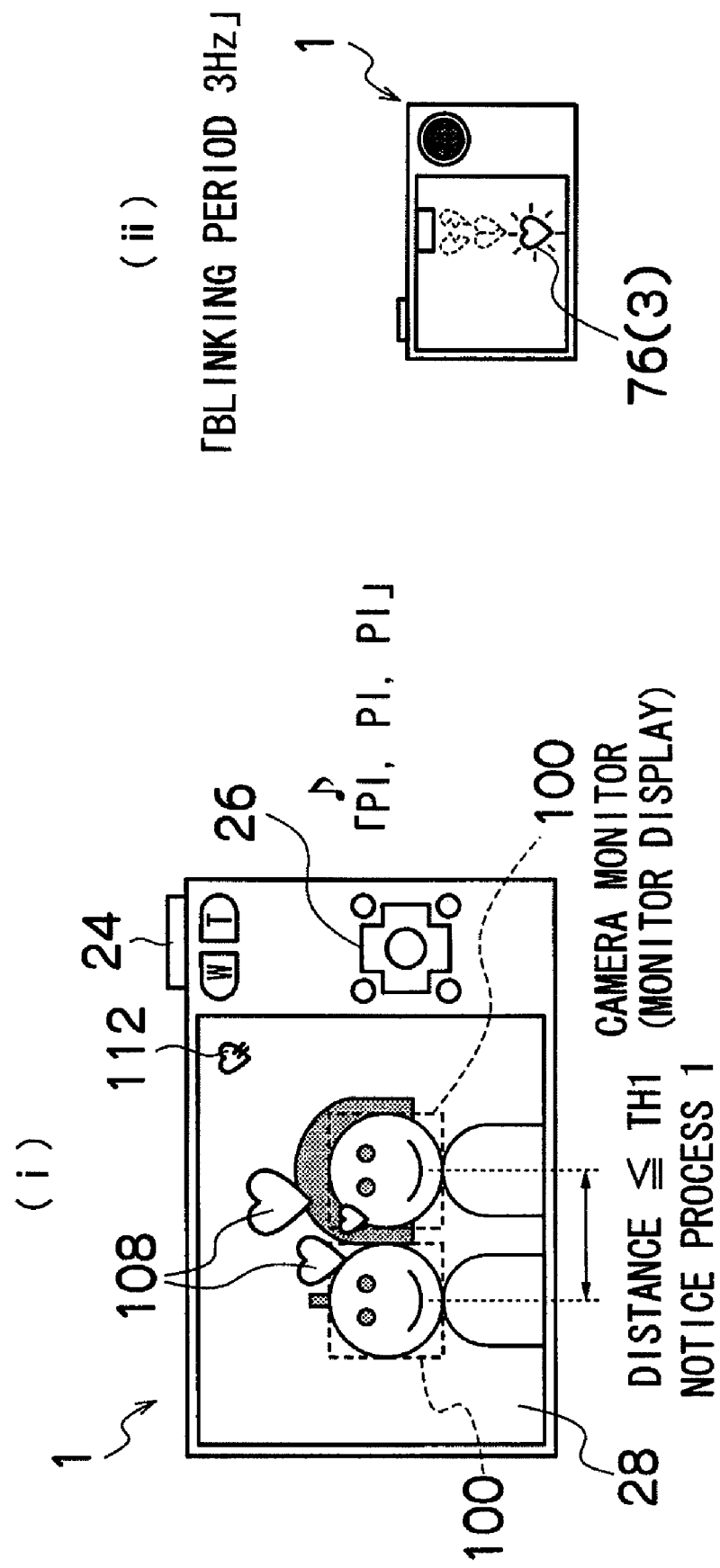

FIGS. 6A to 6C are diagrams which show another configuration of actions of a monitor 28, a LED 76 and a speaker 80 at the couple shot timer mode.

FIG. 6A is a diagram showing the notice process 3. The notice process 3 displays an emphatic arrow 104 which is directed to make the two representative faces closer to each other, next to the face box 100 on the monitor 28. The notice process 3 outputs the audio of the heart pound "pitter-patter . . . pitter-patter . . . pitter-patter . . . " from the speaker 80 (not shown) and also lights up the LED 76 (1) provided on the front of the digital camera 1.

FIG. 6B is a diagram showing the notice process 2. The notice process 2 displays an arrow 106 which is directed to make the two representative faces closer to each other, next to the face box 100 on the monitor 28. The notice process 2 outputs the audio of the heart pound "pitter-patter, pitter-patter, pitter-patter" which is faster than at the notice process 3 from the speaker 80 (not shown) and also lights up the LED 76 (2) which is separate from the LED 76 (1) provided on the front of the digital camera 1.

FIG. 6C is a diagram showing the notice process 1. The notice process 1 displays a heart shape mark 108 in the middle of the two face boxes 100 on the monitor 28. The notice process 1 outputs the audio of the heart pound "pitter-patter, pitter-patter, pitter-patter" which is faster than at the notice process 2 from the speaker 80 (not shown) and also lights up the LED 76 (3) which is separate from the LED 76 (1) or the LED 76 (2) provided on the front of the digital camera 1.

In this way, the notice can be given by displaying the arrow to make the faces closer on the monitor 28, outputting not only beep but also the initiative sound, and providing a plurality of the LEDs 76 and lighting up one of the LEDs 76 corresponding to the distance between the human faces. Also, the LED 76 may be a multicolor LED so that the color of the LED 76 is changed depending on the distance between the human faces.

As explained above, it is possible for the user to know how to move the object or how the objective person should move under the condition that the user is not able to look closely the monitor display because the positional relation of the object is noticed in real time at the couple shot timer mode. Therefore, it is possible to take a photograph which has a desired composition of the person. At the same time, when a state in which the distance between the human faces is the predetermined value or more lasts for the certain period of time or more, the action of the timer shooting is started and the real shooting is performed after the timer time elapses. Thereby, the objective persons can make a facial expression after getting close to each other, and it is possible to take a photograph with leeway.

In the present embodiment, the monitor 28, the LED 76, and the speaker 80 give the notice but the digital camera 1 does not have to have all of them. There is no problem, when the notice is possible by at least one of them. The notice of the present embodiment takes in three steps but it does not matter how many steps needed.

In addition, the digital camera 1 may be configured so that the user can set the timer time in the timer shooting mode where shooting is started when the state in which the distance between the human faces is TH1 or less lasts for a time t1 or more.

Second Embodiment

Figure 7:
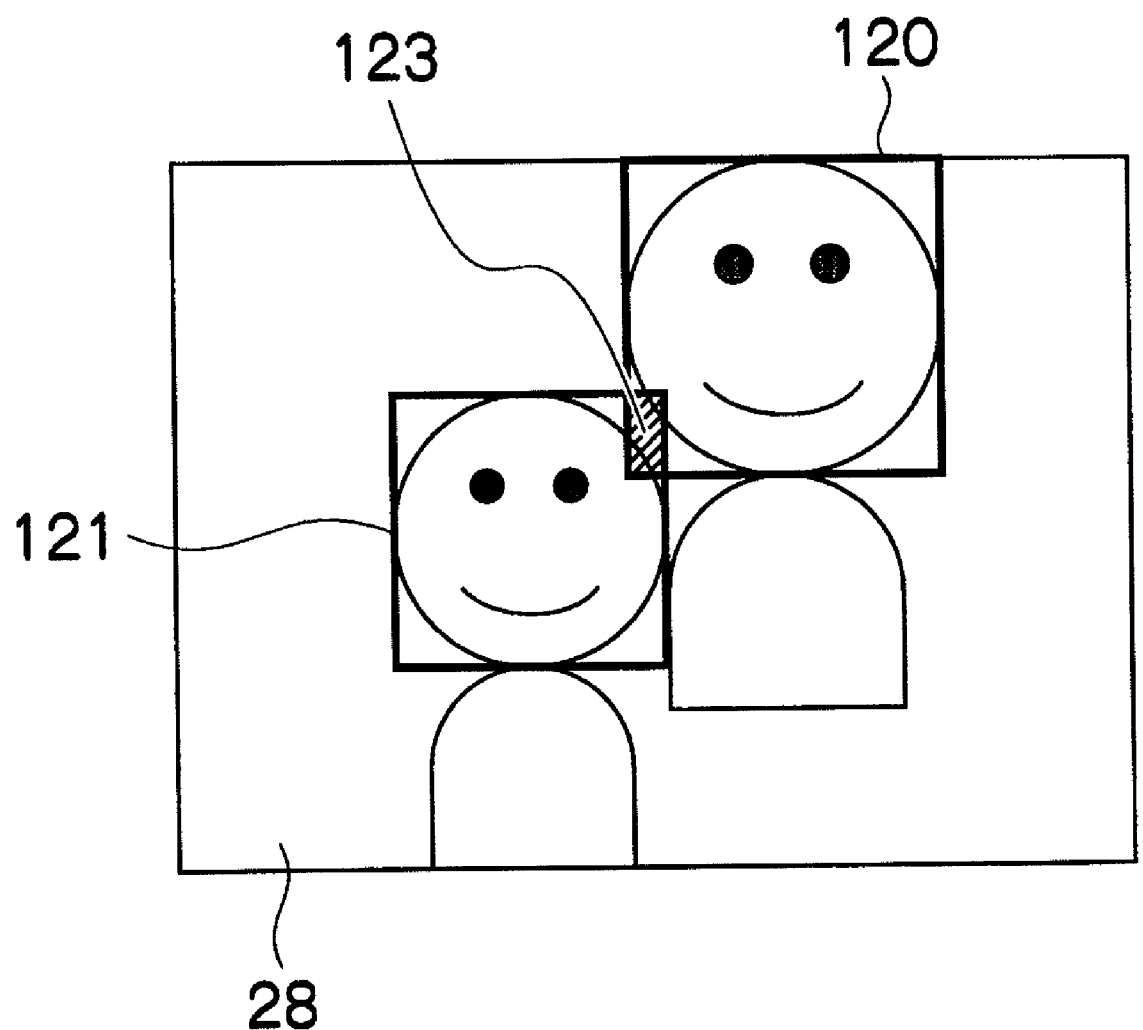
FIG. 7 is a diagram which shows a degree of faces overlapping.

Referring to FIG. 7 to FIG. 8C, the couple shot timer mode of a second embodiment is explained. With the couple shot timer mode of the second embodiment, the positional relation determining unit 72 calculates the distance between the human faces and the degree of overlapping of the detected human faces. Then, starting the notice process and the timer shooting is controlled based on the degree of overlapping of the detected human faces.

First, the degree of overlapping of the detected human faces is explained. As shown in FIG. 7, the face boxes of the two chosen representative faces are 120 and 121. When the area of the face box 120 is signified as S1, the area of the face box 121 is signified as S2, and the area of overlapping of the face boxes 120 and 121 is signified as S3 here, the degree of overlapping can be shown below.

$$\text{The degree of overlapping} = S3 \div (S1+S2) \times 100 \, [\%] \qquad \text{[Formula 3]}$$

The degree of overlapping which is calculated in this way and the predetermined threshold value are compared and the notice process is chosen. Specifically, when the distance between the human faces is equal to or less than TH1 and the degree of overlapping of the faces is equal to or less than TH3, the notice process 1 is performed and the timer shooting is started.

Figure 8A:
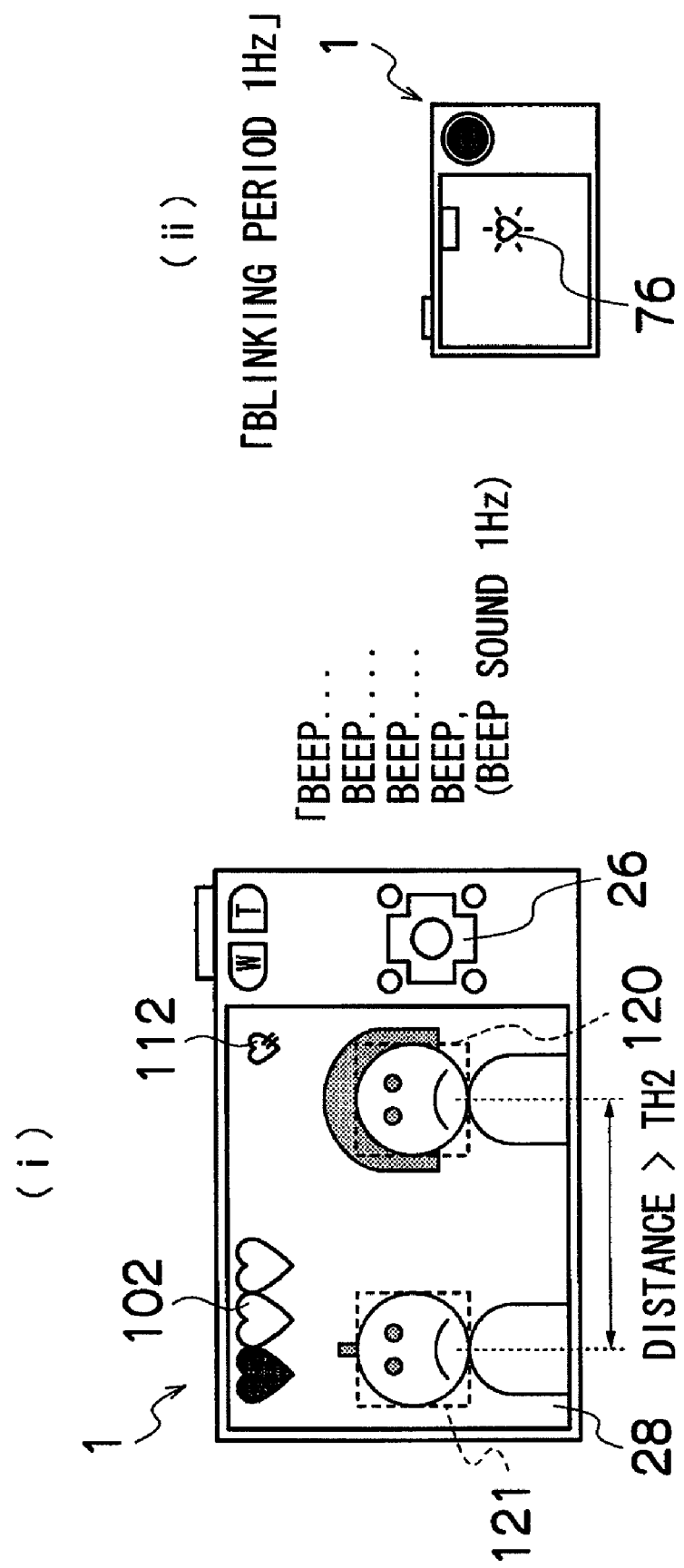

FIGS. 8A to 8C are diagrams showing the notice process 3, the notice process 2, and the notice process 1, respectively. As well as the first embodiment, the notice is given to the user by lighting up the heart shape icons 102 on the monitor 28. Also, a beep is output from the speaker 80 (not shown) and the LED 76 blinks to give a notice to persons to be photographed (objects).

As shown in FIGS. 8A to 8C, the notice process 3 is performed in the case where the distance between the human faces is larger than TH1, the notice process 2 is performed in the case where the distance between the human faces is equal to or less than TH1, and the notice process 1 is performed in the case where the distance between the human faces is less than TH1 and the degree of overlapping of the faces is equal to or more than TH3.

When the notice process 1 is performed, it is determined if a state where the distance between the human faces is TH1 or less and where the degree of overlapping of the faces is TH3 or more, lasts for the time t1 or more. When the state lasts for equal to or more than the time t1, the timer shooting is started. The real shooting is performed after the elapse of the predetermined time at the timer shooting and the image signal obtained by the real shooting is recorded in the recording medium 32 with the medium controller 34.

In this manner, in the timer shooting mode, the notice and the control of the timer shooting may be performed based on the distance between the human faces and the degree of overlapping of the faces.

Third Embodiment

Referring to FIGS. 9A to 10C, the couple shot timer mode of a third embodiment is explained. The positional relation determining unit 72 calculates the distance between the human faces and also the difference of inclination of the detected human faces at the couple shot timer mode of the third embodiment. The notice process and starting of the timer shooting are controlled based on the distance between the human faces and the difference of inclination of the faces.

Figure 9A:
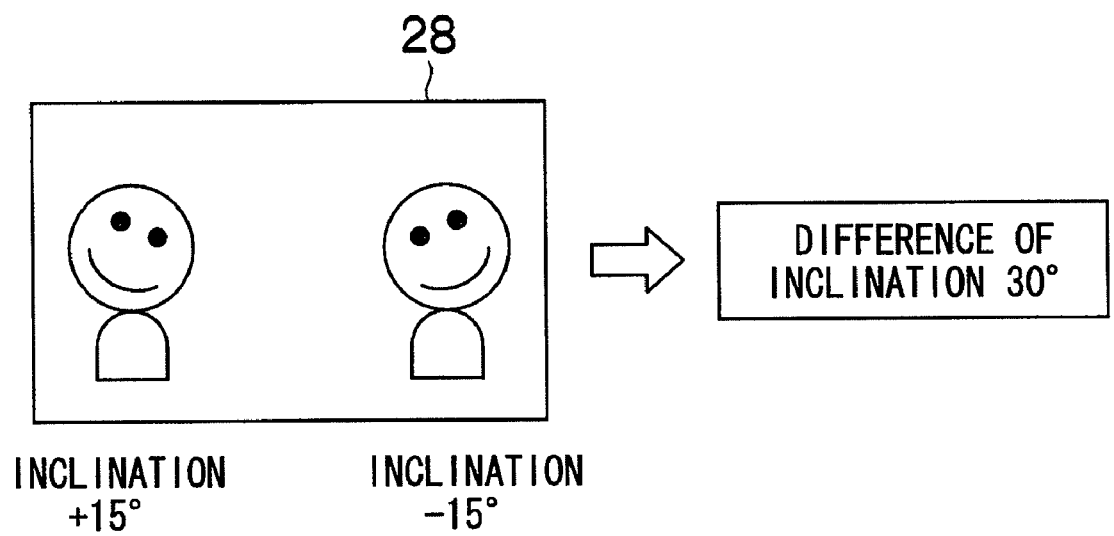
FIGS. 9A and 9B are diagrams which show inclination differences between two representative faces.
Figure 9B:
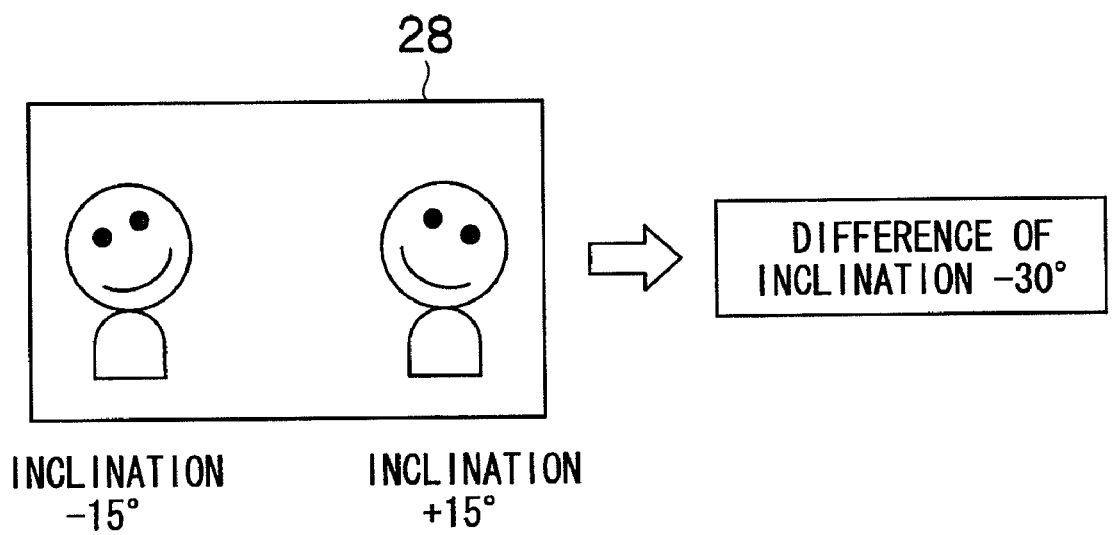

First, the difference of inclination of the faces is described. As shown in FIGS. 9A and 9B, the inclinations of the two chosen representative faces are calculated. The inclination of the face is defined by the angle formed with a line connecting a right and a left eyes and the horizontal line. Also, the angle inclined in a clockwise direction is signed as plus and the angle inclined in a counter-clockwise direction is signed as minus. When the inclination of the face on the right as facing the drawing is signified as θ1 and the inclination of the face on the left as facing the drawing is signified as θ2, the difference of inclination of the faces can be shown with the formula below.

$$\text{The difference of inclination of the faces} = θ1-θ2 \qquad \text{[Formula 4]}$$

Thus, θ1=+15°, θ2=−15° and the difference of inclination of the faces=+30° in case of FIG. 9A. In case of FIG. 9B, θ1=−15°, θ2=+15° and the difference of inclination of the faces=−30°.

The difference of inclination of the human faces calculated in this manner is compared to the predetermined threshold value TH4, and the notice process is chosen based on the comparison result. In particular, when the distance between the human faces is TH1 or less and when the difference of inclination of the faces is TH4 or more, the notice process 1 is performed and the timer shooting is started.

Figure 10B:
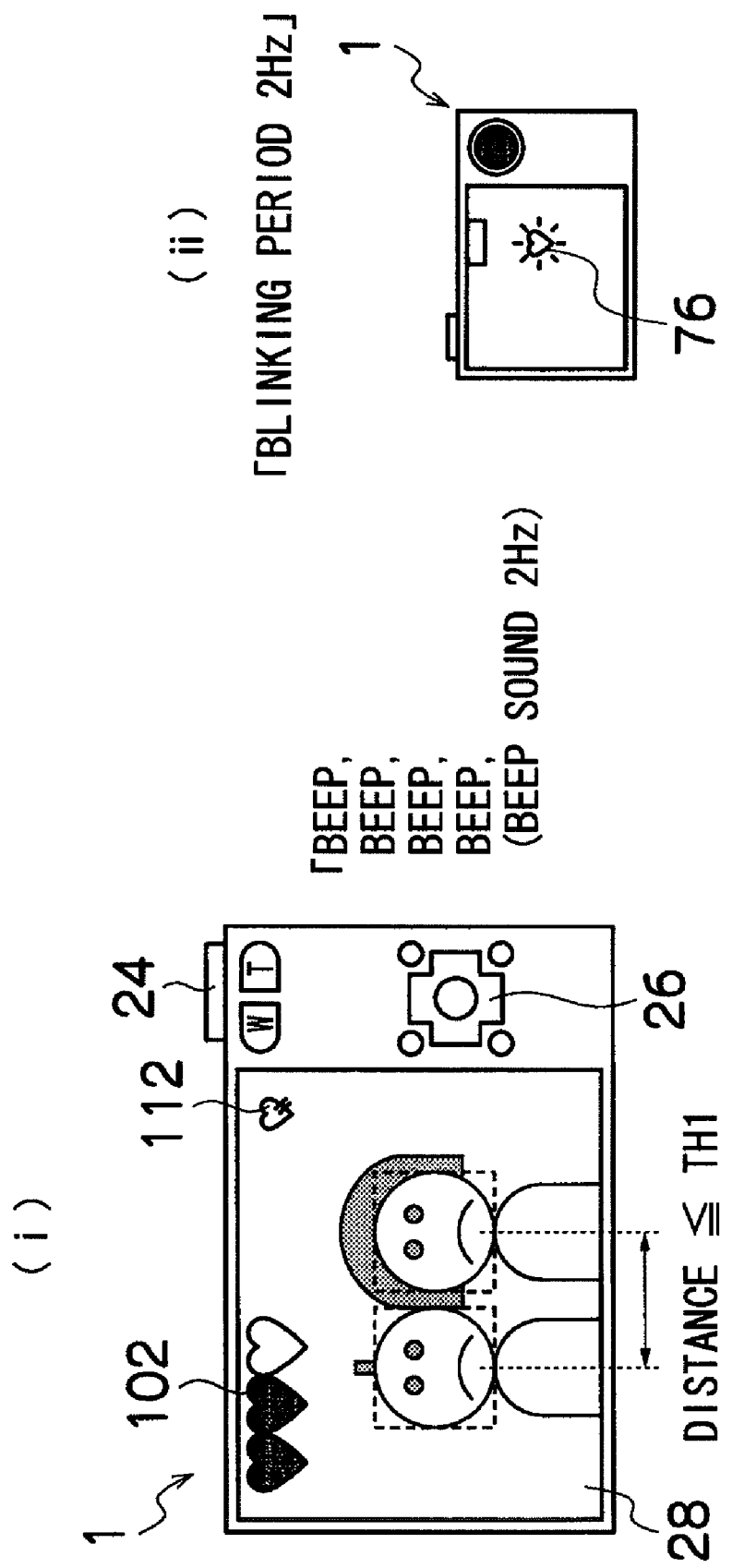

FIGS. 10A to 10C are diagrams showing the notice process 3, the notice process 2 and the notice process 1, respectively. In the same manner as the other embodiments, the notice is given to the user by lighting up the heart shape icons 102 on the monitor 28. Also, a beep is output from the speaker 80 (not shown) and the LED 76 blinks to give a notice to persons to be photographed (objects).

As shown in FIGS. 10A to 10C, the notice process 3 is performed in the case where the distance between the human faces is TH1 or less, the notice process 2 is performed in the case where the distance between the human faces is larger than TH1, and the notice process 1 is performed in the case where the distance between the human faces is TH1 or less and where the difference of inclination of the faces is TH4 or more.

When the notice process 1 is performed, it is determined if the state where the distance between the human faces is TH1 or less and where the difference of inclination of the faces is TH4 or more lasts for the time t1 or more. When the state lasts for equal to or more than the time t1, the timer shooting is started. The real shooting is performed after the elapse of the predetermined time at the timer shooting and the image signal obtained by the real shooting is recorded in the recording medium 32 with the medium controller 34.

In this manner, the notice and the control of the timer shooting may be performed based on the distance between the human faces and the difference of inclination of the faces.

The difference of inclination of the faces is compared to the predetermined threshold value TH4 in the present embodiment. However, when the inclination of each face is inclined toward one another, in other words, when the face on left with facing the drawing has the plus direction angle and the face on right has the minus direction angle, the timer shooting can be performed.

Fourth Embodiment

Referring to FIGS. 11A to 12C, the couple shot timer mode of a fourth embodiment is explained. The positional relation determining unit 72 calculates the distance between the human faces and also the difference of inclination of the detected human faces at the couple shot timer mode of the third embodiment. The notice process and starting of the timer shooting are controlled based on the distance between the human faces and the difference of the directions of the faces (face direction).

First, the difference of the directions of the faces is explained. FIGS. 11A to 11C have (ii) which shows two representative faces shown on the monitor 28 and (i) which shows the overhead view of (ii), respectively. As shown in FIGS. 11A to 11C, the directions of the two chosen representative faces are calculated. The angle of direction of a face is defined as 0° when the face looks toward the other face. The angle of the direction increases to the plus direction as the face looks toward a front of the camera, and is defined as +90° when the face looks straight in front of the camera. The angle of the direction of the face is calculated based on the position of the nose and so on.

When the direction of the face on left with facing to the drawing is defined as θ3 and the direction of the face on right is defined as θ4, the difference of the directions of the faces can be shown with the formula below.

The difference of the directions of the faces=θ3+θ4    [Formula 5]

Accordingly, the directions of the faces in FIG. 11A are θ3=0° and θ4=0°, and the difference of the directions of the faces is 0°. The directions of the faces in FIG. 11B are θ3=30° and θ4=45°, and the difference of the directions of the faces is 75°. In the same way, the directions of the faces in FIG. 11C are θ3=0° and θ4=90°, and the difference of the directions of the faces is 90°.

The notice process is chosen by comparing the difference of the directions of the faces calculated in this way to the predetermined threshold value TH5. Specifically, when the distance between the human faces is equal to or less than TH1 and the difference of the directions of the faces is equal to or less than TH5, the notice process 1 is performed and the timer shooting is started.

Figure 12B:
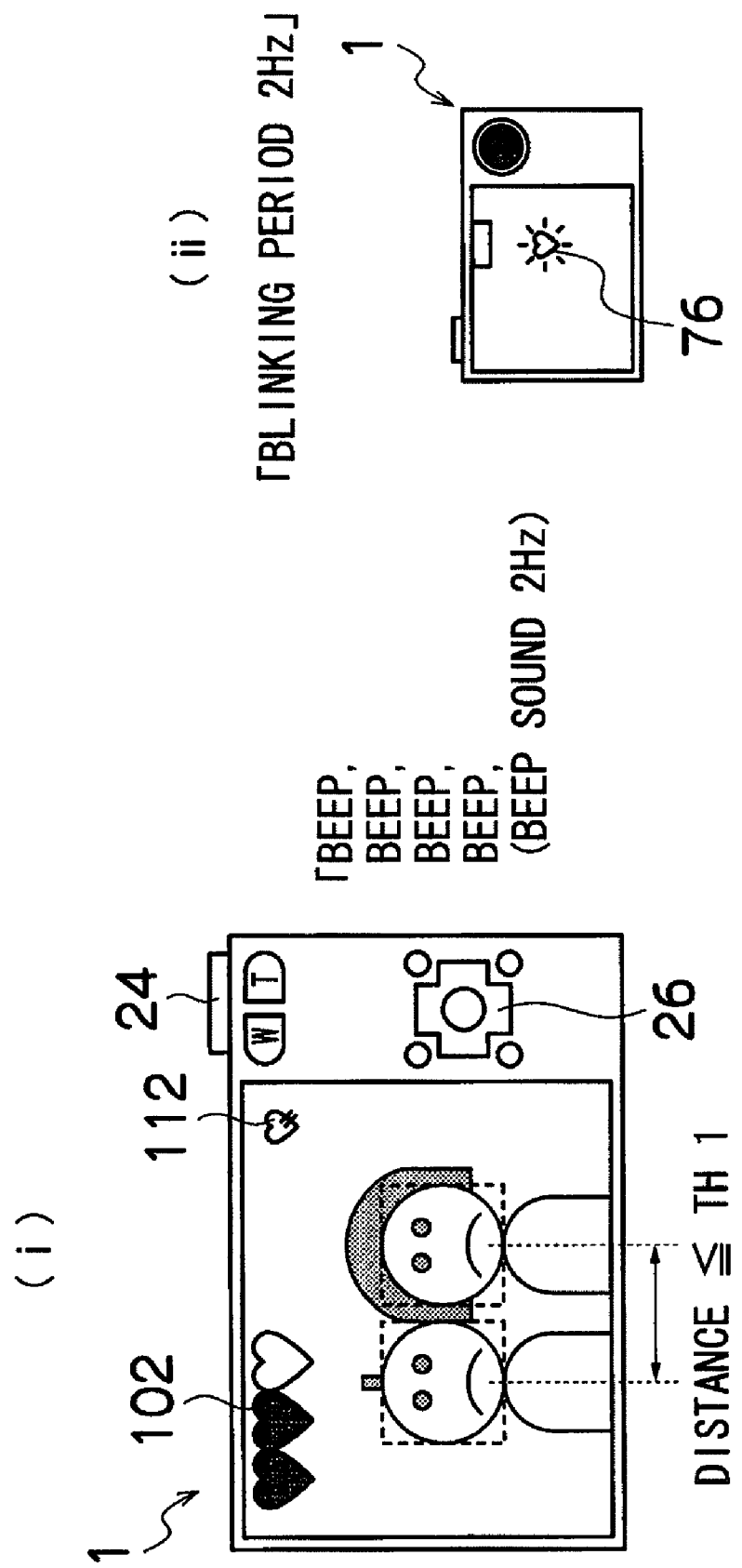

FIGS. 12A to 12C are diagrams showing the notice process 3, the notice process 2 and the notice process 1, respectively. As well as the other embodiments, the notice is given to the user by lighting up the heart shape icons 102 on the monitor 28. Also, a beep is output from the speaker 80 (not shown) and the LED 76 blinks to give a notice to persons to be photographed (objects).

As shown in FIGS. 12A to 12C, the notice process 3 is performed in the case where the distance between the human faces is TH1 or less, the notice process 2 is performed in the case where the distance between the human faces is larger than TH1, and the notice process 1 is performed in the case where the distance between the human faces is TH1 or less and where the difference of the directions of the faces is TH5 or less.

When the notice process 1 is performed, it is determined if the state where the distance between the human faces is TH1 or less and where the difference of the directions of the faces is TH5 or less, lasts for the time t1 or more. When the state lasts for equal to or more than the time t1, the timer shooting is started. The real shooting is performed after the elapse of the predetermined time at the timer shooting and the image signal obtained by the real shooting is recorded in the recording medium 32 with the medium controller 34.

In this manner, the notice and the control of the timer shooting may be performed based on the distance between the human faces and the difference of the directions of the faces.

What is claimed is:
1. An image capturing apparatus comprising:
   an image capturing device which receives an optical image of an object subjected to light via an image capturing lens and converts the optical image into an image signal;
   a face detecting device which detects a plurality of human faces from the image signal;
   a face distance calculating device which calculates a distance between the detected human faces;
   a notice device which gives a notice corresponding to the calculated distance between the human faces;
   a timer shot device which performs a real shooting after an elapse of a first predetermined time since a shooting instruction;
   a control device which gives the shooting instruction to the timer shot device when the calculated distance between the human faces is less than a predetermined value; and
   an evaluation value calculating device which calculates an evaluation value indicating whether a composition of the image signal is good or not according to at least one of parameters including a degree of overlapping of the detected human faces, a difference of directions of the detected human faces, and an inclination of the detected human faces,
   wherein the control device gives a shooting instruction to the timer shooting device when the calculated distance between the human faces is less than the predetermined value and the evaluation value of the evaluation value calculating device is a predetermined value or more.

2. The image capturing apparatus according to claim 1, wherein
the control device gives the shooting instruction to the timer shooting device, when a state in which the calculated distance between the human faces is less than the predetermined value lasts for a second predetermined time or more.

3. The image capturing apparatus according to claim 1, wherein
the control device gives the shooting instruction to the timer shooting device, when a state in which the calculated distance between the human faces is the predetermined value or more lasts for a third predetermined time or more.

4. The image capturing apparatus according to claim 1, wherein
the notice device gives a warning when a state in which the calculated distance between the human faces is the predetermined value or more lasts for a third predetermined time or more.

5. The image capturing apparatus according to claim 1, further comprising
a switching device which switches the control device between an enable state and a disable state.

6. The image capturing apparatus according to claim 5, wherein
the switching device is a shutter release button, and
the control device is switched between the enable state and the disable state every time when the shutter release button is operated.

7. The image capturing apparatus according to claim 5, wherein
the switching device switches the control device to the disable state when a state in which the calculated distance between the human faces is the predetermined value or more lasts for a fourth predetermined time or more.

8. The image capturing apparatus according to claim 1, further comprising
an operation mode switching device which switches an operation mode of the image capturing apparatus, wherein
the control device is set in the enable state when the operation mode is set in a prescribed mode by setting the operation mode switching device.

9. The image capturing apparatus according to claim 1, wherein
the notice device gives a notice corresponding to the distance between the human faces calculated based on sizes of the detected human faces.

10. The image capturing apparatus according to claim 1, wherein
the face distance calculating device calculates a distance between a human face located nearest to a center of a shot image among the detected human faces and another human face whose size is closest to that of the human face located nearest to the center.

11. The image capturing apparatus according to claim 1, wherein
the face distance calculating device calculates a distance between a largest face among the detected human faces and another face whose size is closest to the largest face.

12. The image capturing apparatus according to claim 1, wherein
the notice device includes at least one of a display device, a sound generating device, and a light emitting device.

13. The image capturing apparatus according to claim 12, wherein
the display device displays a pass-through image according to the image signal and gives a notice corresponding to the calculated distance between the human faces.

14. The image capturing apparatus according to claim 12, wherein
the display device gives a notice by displaying an icon corresponding to the calculated distance between the human faces.

15. The image capturing apparatus according to claim 12, wherein
the sound generating device gives a notice by outputting a voice which differs depending on the calculated distance between the human faces.

16. The image capturing apparatus according to claim 12, wherein
the sound generating device gives a notice by changing a frequency of an output sound depending on the calculated distance between the human faces.

17. The image capturing apparatus according to claim 12, wherein
the light emitting device gives a notice by changing a blinking period depending on the calculated distance between the human faces.

18. A method for controlling an image capturing comprising:
an image capturing step of receiving an optical image of an object subjected to light via an image capturing lens and converting the optical image into an image signal;
a face detecting step of detecting human faces from the image signal;
a face distance calculating step of calculating a distance between the detected human faces;
a notifying step of giving a notice corresponding to the calculated distance between the human faces;
a timer shot step of performing a real shooting after an elapse of a first predetermined time since a shooting instruction;
a control step of giving a shooting instruction to the timer shot step when the calculated distance between the human faces is less than a predetermined value, and
an evaluation value calculating step of calculating an evaluation value indicating whether a composition of the image signal is good or not according to at least one of parameters including a degree of overlapping of the detected human faces, a difference of directions of the detected human faces, and an inclination of the detected human faces,
wherein a shooting instruction is given to the timer shot step when the calculated distance between the human faces is less than the predetermined value and the evaluation value calculated at the evaluation value calculating step is a predetermined value or more.

* * * * *